United States Patent
Michaelis et al.

(10) Patent No.: US 10,764,545 B2
(45) Date of Patent: Sep. 1, 2020

(54) PROJECTION DEVICE AND METHOD FOR PROJECTION COMPRISING OPTICAL FREE-FORM SURFACES

(71) Applicant: Fraunhofer-Gesellschaft zur Förderung der angewandten Forschung e.V., München (DE)

(72) Inventors: Dirk Michaelis, Jena (DE); Peter Schreiber, Jena (DE)

(73) Assignee: Fraunhofer-Gesellschaft zur Förderung der angewandten Forschung e.V. (DE)

( * ) Notice: Subject to any disclaimer, the term of this patent is extended or adjusted under 35 U.S.C. 154(b) by 0 days.

(21) Appl. No.: 15/910,823

(22) Filed: Mar. 2, 2018

(65) Prior Publication Data

US 2018/0199017 A1  Jul. 12, 2018

Related U.S. Application Data

(63) Continuation of application No. PCT/EP2016/070490, filed on Aug. 31, 2016.

(30) Foreign Application Priority Data

Sep. 4, 2015 (DE) .................. 10 2015 216 985

(51) Int. Cl.
*G02B 26/00* (2006.01)
*H04N 9/31* (2006.01)
(Continued)

(52) U.S. Cl.
CPC ....... *H04N 9/3152* (2013.01); *G02B 27/0025* (2013.01); *G02B 27/0927* (2013.01);
(Continued)

(58) Field of Classification Search
CPC ............ G02B 27/0025; G02B 27/0927; G02B 27/0955; H04N 9/3152
(Continued)

(56) References Cited

U.S. PATENT DOCUMENTS

| 2,186,123 A | 1/1940 | Rantsch et al. |
| 5,162,844 A | 11/1992 | Ueda |

(Continued)

FOREIGN PATENT DOCUMENTS

| CN | 1639620 A | 7/2005 |
| CN | 101738837 A | 6/2010 |

(Continued)

OTHER PUBLICATIONS

Office Action dated May 14, 2019 issued in the parallel Japanese patent application No. 2018-512143 (12 pages with English translation).

(Continued)

*Primary Examiner* — William Choi
(74) *Attorney, Agent, or Firm* — Haynes and Boone, LLP

(57) ABSTRACT

What is shown is a projection device having at least one light source and an array of optical channels. Each channel includes a first refractive optical free-form surface and a second refractive optical free-form surface and projection optics. The first and second refractive optical free-form surfaces are arranged between the light source and the projection optics and cause Köhler illumination of the projection optics by an object light pattern, resulting in the image to be projected on an image surface of the projection optics, wherein images of the array of optical channels superimpose one another.

20 Claims, 23 Drawing Sheets

(51) Int. Cl.
G03B 21/13 (2006.01)
G02B 27/00 (2006.01)
G02B 27/09 (2006.01)
F21W 121/00 (2006.01)

(52) U.S. Cl.
CPC ......... *G02B 27/0955* (2013.01); *G03B 21/13* (2013.01); *F21W 2121/00* (2013.01)

(58) Field of Classification Search
USPC .................................................. 359/290–292
See application file for complete search history.

(56) References Cited

U.S. PATENT DOCUMENTS

| | | |
|---|---|---|
| 8,616,711 B2 | 12/2013 | Yatsu |
| 8,717,671 B2 | 5/2014 | Tatsuno |
| 2006/0285078 A1 | 12/2006 | Kasazumi et al. |
| 2008/0316761 A1 | 12/2008 | Minano et al. |
| 2011/0228231 A1 | 9/2011 | Schreiber et al. |
| 2014/0104317 A1 | 4/2014 | Tsai |
| 2014/0146290 A1 | 5/2014 | Sieler et al. |
| 2015/0205099 A1 | 7/2015 | Arai |
| 2016/0065921 A1 | 3/2016 | Sieler et al. |

FOREIGN PATENT DOCUMENTS

| | | |
|---|---|---|
| CN | 103688219 A | 3/2014 |
| DE | 102009024894 A1 | 12/2010 |
| DE | 102011014779 A1 | 9/2012 |
| DE | 102011076083 A1 | 11/2012 |
| DE | 102013208625 A1 | 11/2014 |
| JP | H05-281508 A | 10/1993 |
| JP | 2000-284219 A | 10/2000 |
| JP | 2012-530263 | 11/2012 |
| JP | 2013-190514 A | 9/2013 |
| KR | 10-2008-0094831 | 11/2010 |
| WO | WO 2012/123128 A1 | 9/2012 |

OTHER PUBLICATIONS

Minano, J. C. et al.: Free-form integrator array optics. In: Proc. SPIE, vol. 5942, 2005, 59420C1-12. DOI: 10.1117/12.620240 (12 pages).
Sieler, Marcel et al.: Ultraslim fixed pattern projectors with inherent homogenization of illumination. In: Applied Optics, vol. 51, 2012, S. 64-74. DOI: 10.1364/AO.51.000064 (11 pages).
J. W. Pan, C. M. Wang, H. C. Lan, W. S. Sun, and J. Y. Chang, "Homogenized LED-illumination using microlens arrays for a pocket-sized projector," Opt. Express 15, 10483-10491 (2007) (9 pages).
Harald Ries and Julius Muschaweck. "Tailored freeform optical surfaces." J. Opt. Soc. Am. A, 19(3):590-595, 2002 (6 pages).
V. I. Oliker. „Mathematical aspects of design of beam shaping surfaces in geometrical optics. Trends in Nonlinear Analysis, p. 191-222, 2001 (30 pages).
S. Zwick, R. Feßler, J. Jegorov, and G. Notni, „Resolution limitations for tailored picture-generating freeform surfaces. Optics Express 20, 3642, 2012 (12 pages).
Rengmao Wu, Pablo Benítez, Yaqin Zhang, and Juan C. Minano, "Influence of the characteristics of a light source and target on the monge-ampere equation method in freeform optics design," Opt. Lett., 39(3):634-637, 2014 (4 pages).
Luo, Y., Feng, Z., Han, Y., Li, H., "Design of compact and smooth free-form optical system with uniform illuminance for LED source," Opt. Express 18, 9055-9063, 2010 (9 pages).
Juan C. Minano, Pablo Benítez, José Blen, Asunción Santamaría, „High-efficiency free-form condenser overcoming rotational symmetry limitations, Optics Express 16, 20193-20205, 2008 (13 pages).
Zexin Feng, Lei Huang, Guofan Jin, and Mali Gong, "Designing double freeform optical surfaces for controlling both irradiance and wavefront," Opt. Express, 21(23), 28693-28701, 2013 (9 pages).
M. M. Sulman, J. F. Williams, and R. D. Russel, "An efficient approach for the numerical solution of mongeampere equation," Appl. Numer. Math. 61, 298-307, 2011 (10 pages).
Jacob Rubinstein and Gershon Wolansky, "Intensity control with a free-form lens," J. Opt. Soc. Am. A, 24(2):463-469, 2007 (7 pages).
D. Michaelis, P. Schreiber, and A. Bräuer, "Cartesian oval representation of freeform optics in illumination systems," Opt. Lett. 36(6), 918-920, 2011 (3 pages).
Shuang Zhao, Kai Wang, Fei Chen, Zong Qin, and Sheng Liu, "Integral freeform illumination lens design of LED based pico-projector Integral freeform," Applied Optics 52, 2985, 2013 (9 pages).
[Ricoh] https://www.ricoh.com/technology/tech/040_projection.html, looked up on Aug. 14, 2015 (5 pages).
Daniel Malacara and Zacarias Malacara, "Handbook of Optical Design", (2004) by Marcel Dekker, Inc, (Standard work, basic knowledge in optics, therefore not attached. Provided online info only, 4 pages).
M. Born and E. Wolf, "Principles of Optics", Cambridge University Press, 1999 (Standard work, basic knowledge in optics, therefore not attached. Provided online info only, 5 pages).
Winston, R., Minano, J. C., and Benitez, P. G., "Nonimaging Optics", Elsevier Academic Press, Oxford, 2006 (Standard work, basic knowledge in optics, therefore not attached. Provided online info only, 4 pages).
Shealy, D.L., "Geometrical Methods" and "Classical (Non-laser) Methods" in "Laser Beam Shaping" ed. F. Dickey and S. Holswade, Dekker, 2000 (Standard work, basic knowledge in optics, therefore not attached. Provided online info only, 4 pages).
Office Action dated Mar. 4, 2020 issued in the parallel CN patent application No. 201680064264.0 (13 pages).
Office Action dated Nov. 19, 2019 issued in the parallel Korean patent application No. 10-2018-7009473 (17 pages).

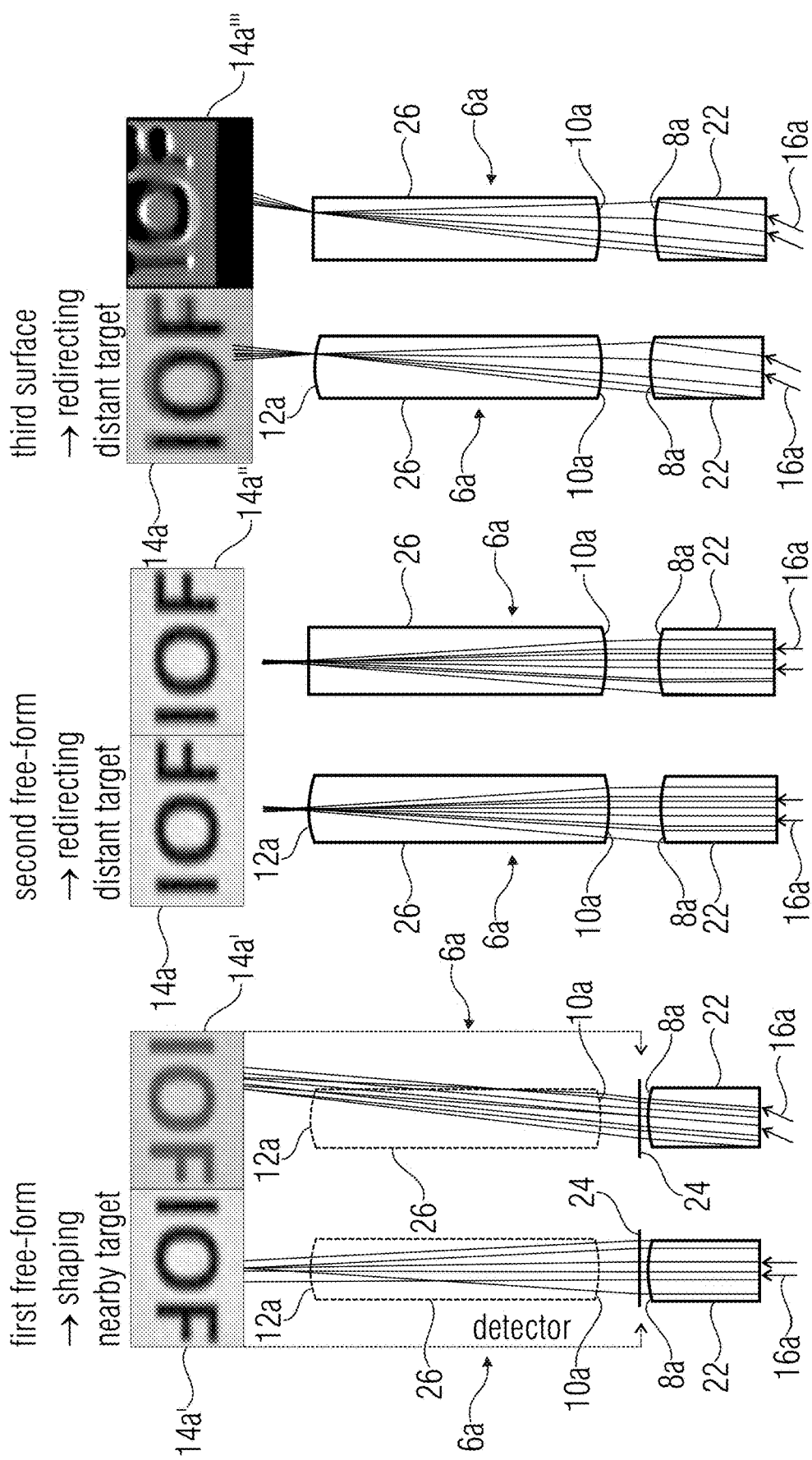

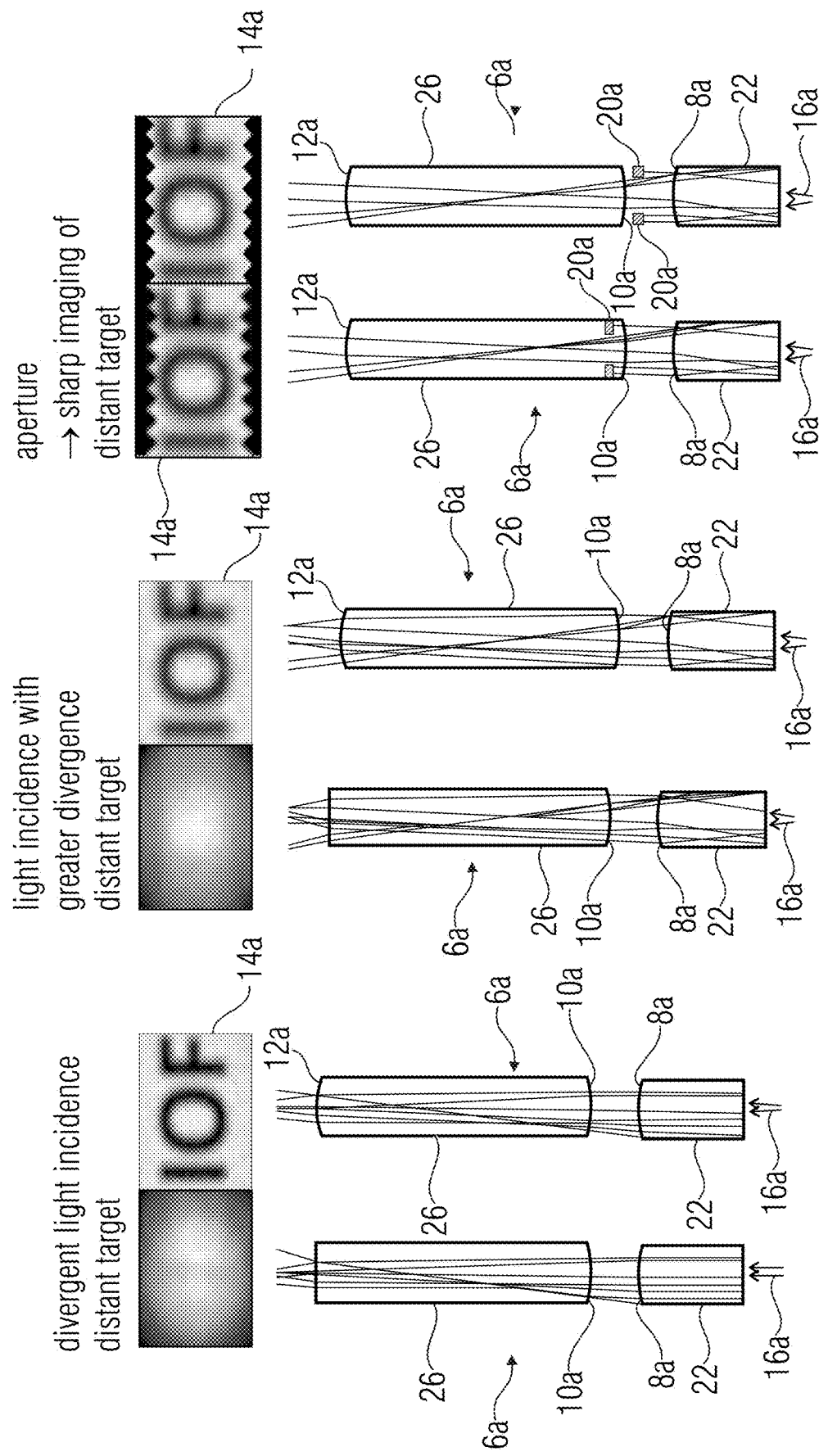

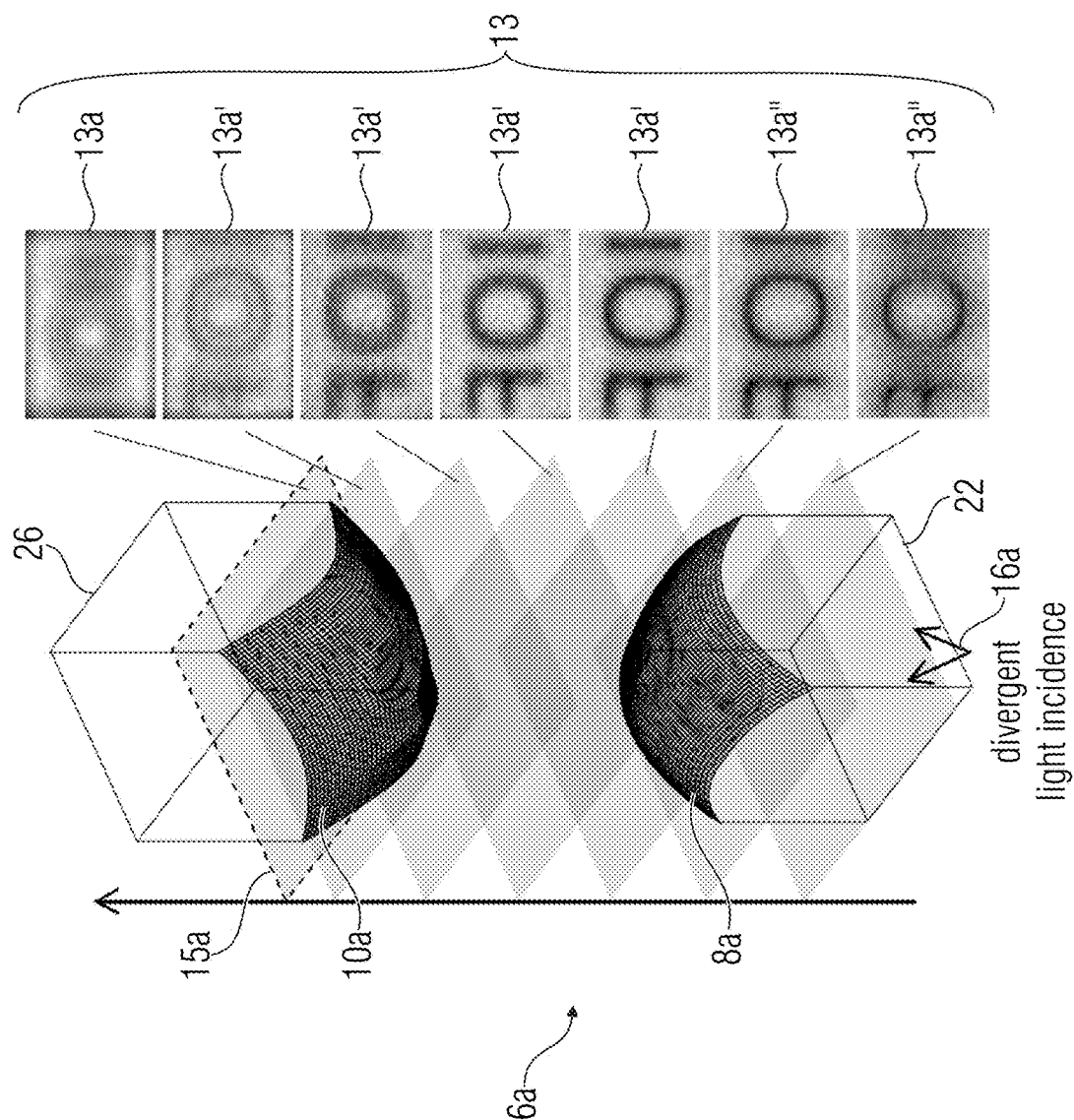

2100

```
┌─────────────────────────────────────┐
│ Arranging a first and a second      │
│ refractive optical free-form        │ ── 2105
│ surface between the light source    │
│ and projection optics               │
└─────────────────────────────────────┘
                 │
                 ▼
┌─────────────────────────────────────┐
│ Causing, using the first and second │
│ refractive optical free-form        │
│ surfaces, Köhler illumination of the│ ── 2110
│ projection optics by a object light │
│ pattern, resulting in the image to  │
│ be projected in an image surface    │
│ of the projection optics            │
└─────────────────────────────────────┘
                 │
                 ▼
┌─────────────────────────────────────┐
│ Superimposing the images of the     │
│ array of the optical channels onto  │ ── 2115
│ one another                         │
└─────────────────────────────────────┘
```

Fig. 22

PROJECTION DEVICE AND METHOD FOR PROJECTION COMPRISING OPTICAL FREE-FORM SURFACES

CROSS-REFERENCE TO RELATED APPLICATIONS

This application is a continuation of co-pending International Application No. PCT/EP2016/070490, filed Aug. 31, 2016, which is incorporated herein by reference in its entirety, and additionally claims priority from German Application No. 10 2015 216 985.5, filed Sep. 4, 2015, which is also incorporated herein by reference in its entirety.

The present invention relates to a projection device and to a method for projecting having refractive optical free-form surfaces. Embodiments exhibit a free-form array projection. In accordance with embodiments, the free-form surfaces generate Köhler illumination of projection optics of the projection device by an object light pattern.

BACKGROUND OF THE INVENTION

The beam shaper/projection unit may be employed when generating any structured illumination in many fields of application, like background and accentuating illumination in general illumination, generating defined radiation profiles for automobile applications, generating light patterns on objects for measuring purposes, for example. Information can be visualized optically, wherein this may be done both by illuminating a real target and by generating virtual images visible to the eye.

In order to be able to objectively perform a comparison between different solution approaches, some relevant characterizing quantities of such beam shapers/projection units will be summarized below briefly. The following characterizing quantities are relevant for most applications in illumination and projection tasks:
(A) ensuring a sufficiently large light flux/optical power
(B) compact, miniaturized optics, wherein the main emphasis is placed on the optics thickness
(C) high power transmission through the optics/power efficiency
(D) way of generating most different light distributions:
  coarse, smooth, weakly varying distributions
  fine, highly patterned light distribution with high a resolution, like in writings, for example, high-resolution images
  range from little contrast up to very high contrasts (like target regions within the illumination range with no light)
  any edge geometries
  most different requirements in combination
(E) homogenization effect relative to spatial source inhomogeneity, in particular way of color mixing, sufficient tolerances, particularly relative to source location and source arrangement
  (i) Patterned illumination and projection of light distributions having single-channel macroscopic projectors are well-known [Malacara]. Any desired light distributions (D) on targets can be generated. However, light is faded out by absorptive slides or dynamics imagers, for example, which may result in a considerable loss in power efficiency (C). Usually, the Köhler illumination principle will be applied, which means transforming the source spatial domain to the target ray domain (E), but further light mixing has to be introduced specifically, like by using honeycomb condensers [Pan]. When miniaturizing (B), i.e. reducing optics height, of single-channel projectors [Pan, US 2006/0285078 A1], the optics area or surface has to be reduced at the same time, which entails a reduction in the transmissible light flux (A).
  (ii) For generating any desired patterned illumination pattern of very high power efficiency (C), refractive or reflective illumination free-forms can be used [Ries, Oliker]. This kind of free-form illumination is based on a refractive or reflective light redistribution and principally does not need any absorptive or fading structures. Usually, the source light is transferred to the target with no additional projection unit. Generating strip patterns for measuring purposes is to be mentioned as an example of application [DE 102011014779 A1]. However, applying this type of free-form redistribution exhibits considerable deficiencies. In light redistribution, the light distribution impinging on the free-form/free-forms (i.e. the source distribution or the source distribution modified by primary optics) has to be well-known and may not be subjected to changes, which means that the system is relatively intolerant (E). Homogenization and light mixing effects and Köhler illumination etc. are not present in this case. In analogy to the macro-projector as described above, the miniaturization and light flux problem applies here, too (A, B). However, the by large greatest deficiency is the limited resolution in light distribution generation for realistic source distributions [Zwick]. Very fine light distribution patterns on the target can only be generated if the source distribution can be described approximately as a wave front, i.e. with very well collimated source radiation or very small a source area, for example. Otherwise, the result will be relatively strong blurring or smearing effects which have to be taken into consideration in optical design on the one hand [Wu] and prevent fine target patterns on the other hand. For this reason, the most frequent practical application of redistribution free-forms is generating very smooth or homogenous illumination [Luo, Wu, Zhao].
  (iii) When connecting projection and free-form optics, two trends can be observed basically. On the one hand, redistribution free-forms as described above are used for good homogenous illumination of slides or imagers or light mixers [Zhao, Minano]. On the other hand, imaging free-forms, i.e. free-form elements in the optical illumination path of the projector, may result in more compact optics of higher imaging quality [Rico, U.S. Pat. No. 8,717,671 B2, U.S. Pat. No. 8,616,711, US 2015/0205099 A1]. However, the deficiencies as described in (i) are not decreased by this.
  (iv) The deficiency of low a light flux as described under (i), i.e. the low brightness on the target, when reducing the optics height, has been eliminated by so-called array projectors [DE 102009024894 A1, DE 102011076083 A1, Sieler]. By using a plurality of optical channels having at least one condenser lenslet, an object pattern to be imaged and at least one projection lenslet per optical channel, the optics height is reduced and high a light flux is ensured as well. Homogenization and light mixture effect, the Köhler illumination principle and tolerances relative to source distributions can be found here. However, the problem of a potentially low power efficiency or system transmission is still present. By absorbing or fading light as a consequence of object patterns to be imaged, considerable transmission losses may arise. Considerable losses result, for example, when generating grey scale profiles having strong irradiation intensity maximums, when forming narrow light pattern features on a less bright or even lacking background illumination or when generating non-trivial boundaries of the real or virtual region to be illuminated.

Well-known single-channel projectors or illumination configurations consequently exhibit the disadvantages that a miniaturization of the projectors/illumination configurations entails a reduction of the light flux transmissible. In addition, current illumination configurations having free-form light redistribution with real input light distributions exhibit considerable deficiencies and can be used exclusively with nearly collimated input light or small source areas for generating spatially high-frequency illumination patterns. Otherwise, the result may be relatively strong smearing or blurring effects so that no fine patterns can be generated in a projected image. In addition, such systems are optically intolerant. Furthermore, apertures in projectors may considerably reduce an input light flux of the projector, the result being strongly reduced power transmission.

SUMMARY

According to an embodiment, a projection device may have at least one light source and an array of optical channels, wherein each channel may have: a first and a second refractive optical free-form surface and projection optics; wherein the first and second refractive optical free-form surfaces are arranged between the at least one light source and the projection optics and cause Köhler illumination of the projection optics by an object light pattern, resulting in an image to be projected by superimposing images of the optical channels of the array on an image surface of the projection optics, wherein the object light pattern is a light pattern to be imaged by the projection optics and includes a light distribution.

According to another embodiment, a method for projecting using a projection device having at least one light source and an array of optical channels may have the steps of: arranging a first or a second refractive optical free-form surface between the light source and projection optics; causing, using the first and second refractive optical free-form surfaces, Köhler illumination of the projection optics by an object light pattern, wherein the light object pattern is a light pattern to be imaged by the projection optics and includes a light distribution; and superimposing the images of the array of optical channels onto one another in an image surface of the projection optics in order to result in an image to be projected.

Embodiments show a projection device comprising at least one light source and an array of optical channels, wherein each channel comprises a first and a second refractive optical free-form surface and projection optics. The first and second refractive optical free-form surfaces are arranged between the light source and the projection optics and cause a Köhler illumination of the projection optics by an object light pattern, resulting in the image to be projected in an image surface of the projection optics, wherein images of the array of optical channels are superimposed onto one another. Thus, an overall light distribution or overall imaging or overall image can be achieved by superimposing the images of the optical channels. That light pattern which is imaged by the projection optics is considered to be the object light pattern. In other words, the object light pattern is the object when imaging, wherein, in contrast to conventional array projectors, not a slide is used, but a light distribution.

The idea underlying the present invention is using Köhler illumination in order to obtain, by means of two refractive optical free-form surfaces arranged in an optical channel, light redistribution and a change in the angular distribution of light of a light source, which causes an object light pattern which can be represented in a projected image by means of the projection optics. The object light pattern may be both real and virtual. The incident light may be both collimated and divergent. In other words, the object light pattern can cause light distribution in the projection optics such that the projection optics projects the image using the light distribution. Using refractive optical free-form surfaces allows, at least with completely anti-reflecting surfaces, complete transmission of the optical input power onto the projected image or illumination target. Thus, the loss in the overall optical power can be reduced and brighter or more intensely illuminated images be projected or imaged, i.e. the irradiance on the target or image plane is increased. The terms irradiance and intensity will subsequently be used as synonyms, wherein both terms relate to both collimated and non-collimated or divergent light. In particular, the term intensity is not limited exclusively to collimated light.

The above principles can be improved considerably by combining free-form light distribution and Köhler illumination of the projection optics. Köhler illumination means that the spatial source pattern is imaged to the entrance pupil of the projection optics in an aberrated manner. In other words, the light source is imaged, by Köhler illumination, to a plane or (curved) surface of the projection optics. Said plane or surface is the entrance pupil of the projection optics, i.e. the spatial light distribution in the entrance pupil is determined by the source pattern. However, due to the free-form light redistribution, the angular distribution information in the entrance pupil is determined by the illumination distribution to be achieved. The result in the projection device behind the entrance pupil of the projection optics is a spatial object light pattern which is imaged onto the target by the projection optics. The object light pattern is located between the source and the projection optics. Object light patterns close to the free-form surfaces (virtual object light pattern in front of the first free-form surface, virtual object light pattern on or between the two free-form surfaces, real object light pattern behind the second free-form surface) can contain a particularly large amount of spatially high-frequency information, despite divergent or non-collimated incident light, i.e. object light patterns having sharp spatially high-frequency light distribution contents can be generated. In case such object light patterns are picked up by projection optics, illumination patterns can be generated on a target without any blurring effects or superimposing artifacts, or with reduced blurring effects or superimposing artifacts, although divergent or non-collimated light of spatially extended light sources is used. A visible reduction in the blurring effects when compared to a conventional free-form illumination concept with no Köhler illumination of projection optics allows an improvement in image sharpness by at least 20%, at least 40% or at least 60%.

In accordance with embodiments, the projection device can comprise a transmission-modulated structure, the transmission-modulated structure being configured to impress spatially high-frequency patterns onto the light pattern in order to generate a sharpened image to be projected in the image plane of the projection optics. Thus, images can be imaged based on the object light patterns which comprise sharper edges or finer structures, for example, but also highly varying smooth intensity distributions or irradiance when compared to a mapping generated without transmission-modulated structures. A transmission-modulated structure may, for example, be an aperture, a slide, a mask or an imager which comprise regions of differing transmission degrees for light or are modulated such that regions of the structure (predominantly) transmit light and further regions of the structure (predominantly) reflect and/or absorb light.

In other words, light impinging on the transmission-modulated structure is essentially or exclusively transmitted or let through in a light-transparent region, wherein light impinging in a light-intransparent region of the transmission-modulated structure is (basically) reflected or absorbed and, thus, not transmitted or let through the structure. The transmission-modulated structure may consequently cause an intensity modulation of the light, wherein the term intensity modulation here may be applied to collimated and divergent light and particularly is not limited to collimated light.

In accordance with further embodiments, the first and/or second optically refractive free-form surface(s) may be configured to increase a radiation intensity of the light from the light source in a light-transparent region of the transmission-modulated structure, in order to obtain, in the light-transparent region of the transmission-modulated structure, higher a irradiance when compared to the irradiance on a light-intransparent region of the transmission-modulated structure. In other words, both optically refractive free-form surfaces may perform light distribution (and angular distribution of the light) in the transmissive or light-transparent region of the transmission-modulated structure, i.e., for example, of the aperture, slide or mask. This is of advantage since, thus, the portion of light absorbed or not let through by the transmission-modulated structure is reduced and thus an increased light intensity or greater irradiance for projecting the image will be available. Consequently, it is possible to project images at increased brightness or irradiance.

In this arrangement, the transmission-modulated structure may form the (final) object light pattern which has been pre-shaped by the first and second optically refractive free-form surfaces. Thus, the projection optics may comprise an object plane or object area located in or at least close to the transmission-modulated structure in order to obtain illumination by the object light pattern in the image area of the projection optics. For far-field illumination, i.e. an illumination target in infinity, the left-side focal plane of the projection optics, i.e. facing the light source, will be at least close to the transmission-modulated structure. In case of illuminating a (real/virtual) target in a finite distance to the projection device, the classical imaging laws [Born-Wolf] will be applied in order to bring the object plane or object area of the projection optics close to the transmission-modulated structure. The further refractive optical free-form surfaces perform light redistribution in order to obtain a light pattern in the plane of the transmission-modulated structure which is similar to the object light pattern. Similarity of the light pattern relative to the object light pattern relates to recognizing a subject or at least to a matching coarse structure or at least position. Thus, the object light pattern may comprise sharper contours or, generally, higher spatial frequencies, however, a pattern or a coarse shape or at least the position of the image to be projected can be recognized already in the light pattern. The object light pattern provided for imaging is then formed by means of the transmission-modulated structure. Additionally, the optically refractive free-form surfaces in this embodiment also generate a change in the angular distribution of the incident light in a way such that Köhler illumination of the projection optics by the object light pattern is obtained.

In accordance with further embodiments, the first refractive optical free-form surface may be configured to perform a spatial light redistribution and/or controlling of the ray angles of light rays emitted by the light source. Alternatively or additionally, the second refractive optical free-form surface may be configured to redirect light rays to the projection optics in a convergent manner in accordance with Köhler illumination, wherein the first and second refractive optical free-form surfaces influence each other. In particular, the first and second optically refractive free-form surfaces, from a mathematical point of view, can be obtained by solving coupled differential equations in order to have both Köhler illumination of the projection optics and a spatial light redistribution such that a desired object light pattern can be generated based on the newly provided light distribution.

Further embodiments show the first and the second refractive optical free-form surfaces which generate, based on a real light pattern, a virtual object light pattern in the optical channel between the light source and the second refractive optical free-form surface, wherein the virtual object light pattern is a mapping of the image to be projected, and wherein the real light pattern forms after transmitting through the first and second refractive optical free-form surfaces. In other words, the first and second refractive optical free-form surfaces here generate a virtual object light pattern located in front of the second optically refractive free-form surface. Expressed in a figurative manner, the same can be obtained by extending the light beams of the real light pattern behind the second refractive optical free-form surface. The virtual object light pattern is an auxiliary representation for illustrating how the real light pattern in the projection optics is represented as the image to be projected. Consequently, the projection optics may use the object light pattern close to the plane or surface where the virtual object light pattern is illustrated, and finally image the same onto the target. In other words, the object plane of the projection optics is placed close to the surface or in the surface where the virtual object light pattern is obtained. In addition, the virtual object light pattern having the least blurring effects (or having the largest or sharpest content of information) may take complex forms not located within a plane. In this case, the object plane of the projection optics can be placed in a center position of this virtual object light pattern and, thus, close to it, since the virtual object light pattern with minimum blurring and the object plane may not be congruent. Nevertheless, the object plane here may, at least approximately (partly), be in the virtual object light pattern aimed at. In order to be able to image such object light pattern having a complex shape in an improved or sharper manner, the projection optics may be implemented, using further free-forms, such that the object area of the projection optics better matches the shape of the object light pattern. If the object light pattern has the shape of a (planar) plane, the object plane of the projection optics the object light pattern will be within that plane where the object light pattern is represented. Otherwise, not the object light pattern aimed at will be imaged, but an adjacent light pattern which will then be the object light pattern (not aimed at).

Further embodiments show that the projection optics is configured to image the image to be projected on a real or onto a virtual projection surface, wherein the projection optics of the array of optical channels are configured to superimpose the images to be projected on a real or on a virtual projection surface. This is of advantage since the projection optics can image the image to be projected on a real projection area or surface (target), like a wall. Additionally or alternatively, the projection device may also project a virtual image which theoretically will only result in a real image in infinity, but can be imaged on a real projection surface using a further lens, like the eye. In this case, the eye would be adjusted to an infinite distance. In analogy, the projection device may also generate a virtual image in a finite distance to the element and, using further optics, like the eye, this image can be brought to a real projection surface. In this case, the eye would be adjusted to a finite object distance. This means that the individual channels of the array of optical channels may be configured to superimpose respective images having the same subject on the real or virtual projection surface. This is advantages since, in accordance with this embodiment, each channel generates images having the same subject which may, for example, differ in a brightness distribution or wavelength ranges (i.e. exemplarily comprise different basic colors) and superimposing the images from different channels results in an improved light distribution on the projection surface. This results in homogenization of the light distribution in inhomogeneous source distributions. Furthermore, improved color mixtures of colored source arrangements can be achieved by this. Finally, the tolerance of the system relative to source arrangements or optics fabrication imprecisions is increased. Thus, a subject of the overall imaging may be made up of the projected (individual) images of the optical channels, wherein the images of the optical channels each comprise a different subject. The individual images are, for example, arranged on the projection surface such that images of two channels exemplarily overlap by one half or one fourth in order to avoid discontinuities in the image transitions. In other words, image errors (exemplarily caused by production imprecision) in a projected (individual) image may, for example, exhibit an uneven distribution of brightness which is compensated by superimposing further images to form an overall image. Alternatively, the individual channels or groups of channels can be configured to generate different images on the real or virtual projection surface, wherein an overall image on the real or virtual projection surface is generated by means of at least partially superimposing the differing images onto one another. This is of advantage since composite overall imagings can be generated from the individual projected images of the channels which, in an individual image of the same size, may only be illustrated with considerably increased complexity. This may, for example, occur when large emission angles of the projection optics are of advantage for irradiating or illuminating the projection surface.

Further embodiments exhibits at least two channels or two groups of channels configured to process differing wavelength ranges, wherein the first channel or the first group of channels reduces imaging errors in a first wavelength range, and wherein the second channel or the second group of channels reduces imaging errors in a second wavelength range. Thus, the different optical channels can be optimized for different wave regions so that a more precise projection can be provided, for example with lower unsharpness or chromatic aberrations in the wavelength ranges for which the channel has been optimized. In addition, the projection device here may comprise a plurality of color filters or a plurality of light sources of differing wavelength ranges, wherein the plurality of color filters or the plurality of light sources are configured to guide light in a first wavelength range in the first channel or the first group of channels and guide light in a second wavelength range in the second channel or the second group of channels. Thus, one channel or one group of channels in the array may be optimized each for the three basic colors, red, green and blue, for example. By tuning or adjusting the optical structures to the individual wavelength ranges, image errors can be reduced so that, when projecting the images, the colored individual images are superimposed to form an overall image which exemplarily comprises improved sharpness or reduced artifacts or aberrations like color fringes, for example, when compared to an overall image generated by channels which are tuned to white light.

In accordance with further embodiments, optical structures of all the channels of the array of optical channels are arranged on planar substrates and/or in planes. This is of advantage since this arrangement does not involve increased manufacturing complexity and, thus, can be produced cheaply. Optical structures here sum up all the elements which have an influence on the light distribution in the optical channel, like the first and second refractive optical free-form surfaces, for example, and optionally further refractive optical free-form surfaces, the projection optics and optionally further projection lenses and the transmission-modulated structures.

In accordance with further embodiments, at least one optical structure may be configured to generate an asymmetrical light distribution in the image plane of the projection optics, wherein the optical structure is arranged on an inclined plane in order to reduce discontinuities between mutually adjacent optical structures of neighboring optical channels, and wherein the projection optics is configured to project the images based on the asymmetrical light distribution. If an asymmetrical light distribution in the projected image is desired, the refractive optical free-form surfaces exemplarily comprise oblique or prismatic surface portions which produce the asymmetry in light distribution. When arranging the optical structures within a plane, jumps or discontinuities which may exemplarily provoke artifacts in the projected image will result at the surfaces where the optical structures of neighboring channels border on each other. By arranging the optical structures on an inclined plane, the degree of discontinuity or a degree of jumps between the adjacent optical structures is reduced, wherein the artifacts here are also reduced. In accordance with a further embodiment, both the first and the second refractive optical free-form surface each and the projection optics may be arranged at least in an optical channel on a curved surface, wherein principal radiation angles of the optical channels are adjusted in order to reduce or avoid projection artifacts and/or optically inactive regions and/or dead zones between the array channels when superimposing the images. This arrangement is, for example, of advantage when all the channels of the array of optical channels are arranged on a common envelope, the principal radiation angles of the individual channels can be adjusted individually in order to minimize the effects mentioned above and to obtain the, from a mathematically point of view, best overall imaging possible after superimposing the projecting images.

In addition, embodiments show the projection device, which subsequently will also be referred to as beam shaper/ projection unit or free-form array projector, comprising at least one light source and optional primary optics, and neighboring optical channels. Each optical channel contains at least two refractive free-form surfaces, a projection lens/ optics and one or several transmission-modulated structures. The optical free-form surfaces arranged on the incident side cause both a spatial light redistribution and control of the radiation angles so that spatial real or virtual light patterns form on the one hand and, on the other hand, Köhler illumination of the downstream projection lens/optics is allowed.

The projection lens/optics transfers the light pattern generated by the free-form light redistribution and by the transmission-modulated units onto one or several real or virtual targets, wherein the overall light distribution forms by superimposing the individual light distributions of the individual channels.

Simply using a light-redistributing free-form surface in the array projector is of little use. Additionally, it is of advantage to use at least two free-form surfaces which are coupled in their effects.

In accordance with embodiments, the beam shaper/projection unit is compact ultra-thin optics (A) having a large light flux (B) at the same time. Both smooth/coarsely patterned light distributions can be generated by free-form light redistribution, and very fine high-resolution light patterns having nearly any contrasts desired can be generated by combining the free-form light redistribution and transmission-modulated structures (D). By applying the free-form light redistribution, the power transmission of the optics can be improved considerably (C). With very fine high-resolution target light patterns, a real light pattern within the optics is generated by the free-form light redistribution, which is very well adapted to the transmission-modulated structures (like apertures) and thus reduces the lossy fading of light strongly. With less fine target light distributions, the lossless free-form light redistribution can be applied exclusively and the transmission-modulated structures rather serve for scattering and stray light minimization. It has to be emphasized in particular here that the pattern smearing/blurring described under (ii) in conventional free-form light redistribution can be reduced very strongly by our novel optics. By the common effect of the two free-form surfaces, the result within the optics is a little blurred object light pattern which is transferred onto the target by the projection lens/optics. In this case, a virtual object light pattern is frequently used which has to be picked up by the imaging projection lens/optics. The imaging projection optics may, in the easiest case, be a single micro-lens. Multi-surface optics may also be used for an improved imaging quality. With a non-trivially distributed "object light pattern", and also with non-trivial target shapes, further free-form surfaces in the imaging projection optics are of advantage. In addition to the most different kinds of target light patterns, the Köhler illumination principle is applied by the optics so that spatial inhomogeneities in the source region will not be visible on the target (E). Superimposing the light distributions of the individual channels on the target results in the overall light distribution. In case at least some channels each serve equal target regions with quasi-equal light sub-distributions, the result is light mixing and a homogenization effect of the optics (E).

In accordance with advantageous implementations of the present invention, it is of advantage to arrange at least two free-form surfaces coupled in their effects in an optical channel in order to perform light redistribution and adaption of the angular distribution of light.

BRIEF DESCRIPTION OF THE DRAWINGS

Embodiments of the present invention will be detailed subsequently referring to the appended drawings, in which:

FIG. 3A-3F is a schematic illustration of a single channel (here with no channel inclination) of the beam shaper/projection unit for explaining principles of effect using an embodiment having three refractive surfaces and an aperture structure;

FIG. 4 is a schematic illustration of a virtual object pattern plane with minimum structure blurring with exclusive free-form beam redistribution using a single channel;

FIG. 6 is a schematic illustration of two free-form surfaces for explaining a basic idea of designing two free-forms at the same time in order to obtain a spatial light pattern and control the angular distribution of the beams, wherein FIG. 6A shows a diagram of free-form laser beam shaping in order to redistribute a collimated input intensity to a certain bundled output intensity, wherein the free-form surfaces are decomposed to sets of pairs of ellipsoids/conics, wherein the relevant foci are placed at the basic element forming the counterpart, wherein FIG. 6B schematically shows generating an ideally converging ray bundle with a certain light intensity distribution from a bundled light source having a certain input light intensity pattern or a certain input light intensity structure, wherein the two free-form surfaces are decomposed to sets of pairs of input ellipsoids and of output ovals (Cartesian ovals), and wherein FIG. 6C schematically shows generating a converging ray bundle of a specific angular distribution with a certain light intensity pattern or a certain light intensity structure from a bundled source light having a certain input light intensity, wherein the two free-form surfaces are decomposed to sets of pairs of input ellipsoids and generalized Cartesian ovals at the output;

FIG. 22 shows a schematic block diagram of a method for projecting images.

DETAILED DESCRIPTION OF THE INVENTION

Figure 1:
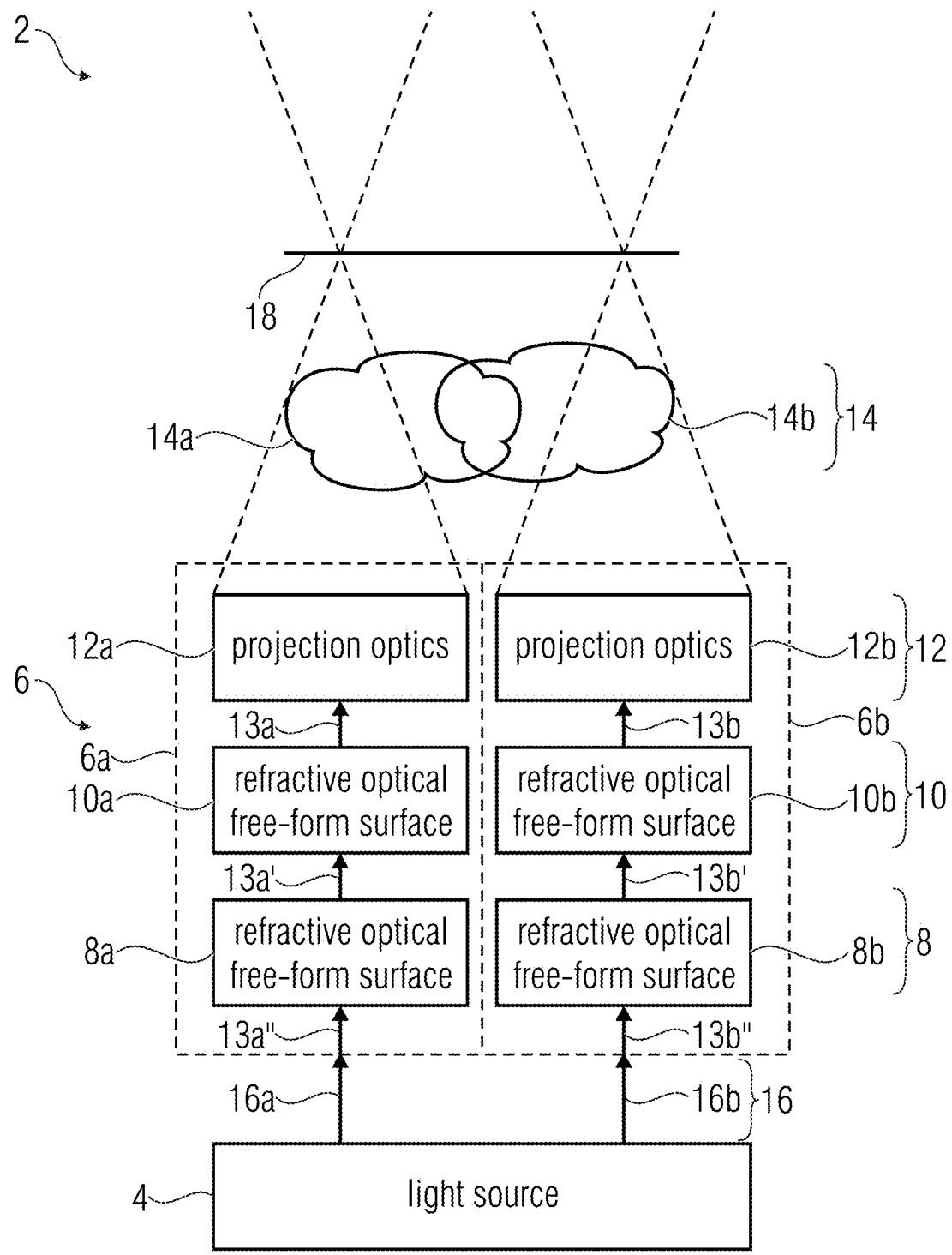
FIG. 1 is a schematic illustration of a projection device.

Same elements or elements of equal effect will be provided with same reference numerals in the following description of the figures so that the description thereof is mutually exchangeable between the different embodiments.

In accordance with embodiments, the object of the invention is providing an ultra-thin high-efficiency optical element for generating patterned illumination or for a projection with a potentially large light flux, wherein additionally a homogenization effect/color mixture of the source radiation takes place. Light distributions on real and/or virtual targets having most different structural features (like fine patterns of high resolution, high contrasts etc.) are to be made possible.

FIG. 1 shows a schematic block diagram of a projection device 2 comprising at least one light source 4 and an array of optical channels 6, 6a, 6b. Each channel comprises a first refractive optical free-form surface 8a, 8b and a second refractive optical free-form surface 10a, 10b, and projection optics 12. The first and second refractive optical free-form surfaces 8, 10 are arranged between the light source 4 and the projection optics 12 and cause Köhler illumination of the projection optics 12 by an object light pattern 12 (both real object light patterns 13a, 13b and virtual object light patterns 13a", 13a", 13b", 13b") which, in an image area of the projection optics 12, form the image to be projected 14a, 14b, wherein images of the array of the optical channels 6 are superimposed onto one another. The light source 4 is configured to emit light 16a, 16b which, in accordance with embodiments, may be divergent or collimated light, incoherent or coherent, or partially coherent, light, monochromatic, polychromatic or white light, i.e. light having a certain spectral distribution and to guide the same to the optical channels 6. The light 16 here at first impinges on the first optical free-form surface 8 and, subsequently the second optical free-form surface 10. The second refractive optical free-form surface 10 may correspondingly be arranged behind the refractive optical free-form surface 8, wherein the spatial relations of "in front of" and "behind" refer to the direction of propagation or impingement of light 16 on the respective element.

The refractive optical free-form surfaces may, in accordance with embodiments, generate both real object light patterns 13a, 13b and virtual object light patterns 13a", 13b", 13a", 13b". The projection optics images the targeted object light pattern onto the target by placing the object plane of the projection optics to the selected object light pattern. In the case of virtual object light patterns, the projection optics 12 exhibits the real light pattern formed by the refractive optical free-form surfaces, however, an object plane/object surface of the projection optics 12 is arranged between the light source 4 and the second refractive optical free-form surface 10 so that the projection optics images the virtual light pattern in the object plane in correspondence with the real light pattern of the refractive optical free-form surfaces.

That light pattern which is imaged by the projection optics is considered to be the object light pattern. In other words, the object light pattern is the object when imaging using the projection optics, wherein, in contrast to conventional array projectors, not a slide is used, but a light distribution.

A (current) spatial distribution of the light is also to be considered to be the light pattern or light distribution. The same becomes an object light pattern in case it is provided for imaging. Such light patterns which may contain a particularly large amount of spatially high-frequency information, like sharp edges, high contrasts, steep edges, large brightness modulations, can be considered to be particularly important object light patterns. Such light patterns consequently exhibit small blurring and smearing effects. On the one hand, they may form when light emanates from a real object. Beams will emanate from every object point. The result is a correlation between radiation location and angle. When radiating through an absorptive slide, for example, the result is a spatial light distribution largely independently of the radiation angle, i.e. there is a quasi-equal spatial distribution for all the radiation angles, the superimposing of which can result in a sharp pattern, for example by imaging. Similar light patterns with special dependencies between radiation location and angle can be generated irrespective of real objects, like slides, by light redistribution and light beam control and allow spatially high-frequency illumination patterns. These object light patterns having the least blurring effects are particularly important since spatially high-frequency illumination patterns can be generated here at high efficiency.

Figure 2:
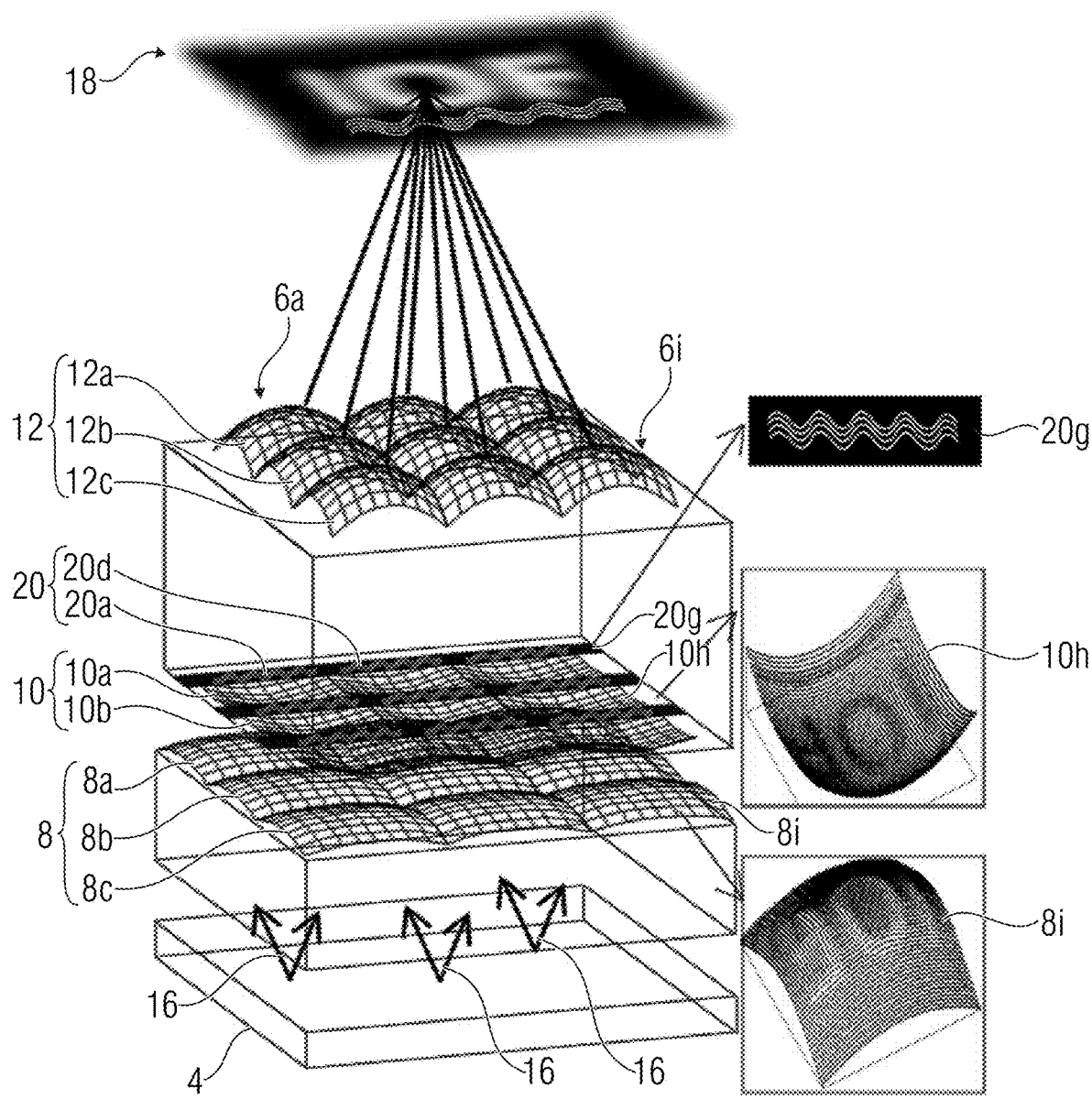
FIG. 2 is a schematic illustration of an inventive embodiment of the beam shaper/projection unit or projection device.

FIG. 2 additionally shows the real projection surface or area 18 on which the images 14a, 14b may be superimposed to form an overall light distribution or overall imaging or overall image. In accordance with alternative embodiments, the projection optics, however, may also image the images 14a, 14b on a virtual target so that a real overall image will form only in infinity or using further optics.

The inventive projection device 2, which subsequently will frequently be referred to as free-form array projector or beam shaper/projection unit, represents a novel optical concept which allows very flat optics with at the same time high a light flux and high system transmission/power efficiency, wherein any light distributions with high resolution requirements are generated on real or virtual targets and, simultaneously, the Köhler illumination principle and source light homogenization can be applied. The exemplary realization in FIG. 2 schematically shows a light source 4 or a light source unit (includes light sources and potential primary optics), from which light 16 is emitted and impinges on arrays having two illumination free-forms each in every array channel. In the realization considered here, the input-side first free-form surfaces are located on the end side of an optical substrate/element and the input-side second free-form surfaces on the input side of a second, subsequent optical substrate/element. Advantageously, transparent refractive materials are used for this. The surface patterns of the two free-forms per channel are implemented such that, on the one hand, a real or virtual light object distribution is generated within the optics by light refraction and, on the other hand, the light impinges on the respective projection lens/optics corresponding to the Köhler illumination.

In other words, the first and the second optically refractive free-form surfaces 8, 10 may be implemented to generate, based on a real light pattern 13a, a virtual object light pattern 13a" in the optical channel 6a to 6i between the light source 4 and the second refractive optical free-form surface 10, wherein the virtual object light pattern is an imaging of the image to be projected, and wherein the real light pattern forms after radiating through the first and second refractive optical free-form surfaces.

The insets 8i, 10h of FIG. 2 exemplarily show two surface profiles. It is easy to recognize surface deformations associated to the letters "IOF". These surface deformations generate an optics-internal light pattern of limited resolution by means of a purely refractive light redistribution. These light patterns are transferred to a target 18 by optical imaging by means of the subsequent projection lens array 12. The bright sequence of letters "IOF" on a dark background field will result on the target. Despite the blurring effect minimization mentioned above, the letters on the target may potentially comprise no sharp structural edges. In order to generate much finer light patterns on the target, additionally transmission-modulated structures 20 are used. In the embodiment shown, aperture structures with wave lines on the second optical substrate/element are used. Generating such fine target distributions with exclusive free-form light redistribution has not been possible so far due to the remaining blurring effects. However, the aperture structure can be illuminated in a suitable manner by means of free-form light redistribution so that power losses can be minimized. In embodiments, the two illumination free-forms per channel generate larger an illumination intensity in the region of the transmission areas of the apertures. The real light pattern, forming behind the aperture, which has been formed both by fading and light redistribution, is imaged onto the target 18 by means of the respective projection lens of the channel with a certain, or sufficient, imaging sharpness. In the implementation example, the position of the sharpest object light pattern for the sequence of letters "IOF" is not identical with the slide plane. For this reason, the object plane of the projection optics has been placed between the potentially sharpest "IOF" object light pattern and the slide plane. Increased blurring of the sequence of letters is accepted here. The image of the slide is also defocus-infested. In the embodiment of the free-form array projector 2 shown, all the channels illuminate the same target region with quasi-equal individual light distributions, i.e. this allows the maximum degree of source light homogenization. The channel superimposing may, for example, be achieved by means of refractive light deflection effects within the input-side first two free-forms. A conventional offset of object-generating structures and projection lenses and the channel arrangement on curved surfaces (see below) may also be applied here. Applying the Köhler illumination principle per channel is not illustrated in FIG. 2 for reasons of clarity but will be illustrated in the following figures.

FIG. 3 illustrates the mode of functioning of a single channel 6a (here with no channel inclination) broken down to the effect of three refractive surfaces and an aperture structure 20a. The light 16a, emanating from collimated sources, impinges on a first refractive free-form surface 8a. Here, this free-form surface is located on the exit side of an optical element 22 (like exit side of an optical substrate). This free-form surface generates a spatial intensity pattern or illumination pattern by light redistribution, i.e. the light is suitably redirected refractively so that the result is an intensity-modulated light distribution corresponding to a target distribution. In the ideal case (when neglecting Fresnel losses), this is done with an efficiency of 100%. In FIG. 3A, this light distribution 14a" was detected shortly behind the first free-form surface (see grey scale images at the top) for both straight collimated incident light and inclined collimated incident light. The detector position 24 is illustrated by the thick line shortly behind the first free-form surface. The light distribution is done by corresponding beam direction changes so that incident light which originally was collimated ideally in the optical axis now exhibits a certain beam angle spectrum behind the free-form (see left of FIG. 3A). Apart from the light redistribution, the first free-form surface will additionally also have to generate a general light convergence in order for incident light inclined to the optical axis to impinge exclusively onto the second free-form surface of the same optical channel and for no cross-talk to result in the free-form region. However, it cannot be ensured by a single free-form that the intensity-modulated or transmission-modulated light distribution completely hits on the projection lens provided for the channel. This is illustrated in the right picture of FIG. 3A. Collimated incident light which, however, is stronger inclined to the optical axis will finally be located partly outside the spatial region provided for the projector lens 12a. Cross-talk in the region of the projection lenslet would consequently only be avoidable with a strongly limited incident angle spectrum.

In order to bring the light onto the projection lens/projection optics in a defined manner, a second free-form surface is needed. In embodiments, this free-form surface is located on the input-side of a second optical element 26 (like entrance surface of a wide optical substrate, see FIG. 3B). A favorable variation here is for the light source 16a to image to the input pupil of the projection optics 12a in an aberrated manner corresponding to the Köhler illumination principle (see FIGS. 3B and 3C). The second free-form surface has to redirect the beam directions of the intensity-patterned light distribution in a suitable way.

The effect of the projection optics 12a following after the two free-form surfaces (in the embodiment of FIG. 3 only one projection lens) can be interpreted in two different ways. The first two free-form surfaces generate an intensity-structured light distribution with additionally influencing the radiation angle. The common effect of the two free-form surfaces forms a minimally blurred object light pattern despite a divergent light incidence. In this case, this is a virtual object pattern close to the second free-form surface. A more precise illustration of the best object pattern can be seen in FIGS. 4, 5. The projection lens images this virtual object pattern onto the target. The second way of explanation is illustrated in FIGS. 3B and 3C. For collimated input light along the optical axis of the channel (or central axis in case an optical axis is difficult to define), a desired light pattern 14a" on the target is generated by the two input free-forms. Here, no projection lens 12a has been necessitated (see left and right of FIG. 3B). For inclined collimated light with no projection lens, an aberrated but mainly shifted target image 14''' will be generated (see right of FIG. 3C). On the one hand, the projection lens prevents shifting of the target image (see FIG. 3C), i.e. decreases the main effect for smearing patterned illumination distributions and, on the other hand, aberrations are reduced. In addition, there may be further aberrations which prevent complete avoidance of blurring effects in the light distribution. FIGS. 3D and 3E illustrate the increasing smearing of a target light distribution with an increased angular divergence of the incident light. The projection optics here is designed for a numerical aperture of approximately +/-7°. With an input beam angular divergence of +/-4.5° (see FIG. 3D), the projection lens is not yet filled completely with light, i.e. the etendue is still increased considerably by the optics. There is little blurring of the light distribution pattern (cf. right pictures in FIGS. 3B and 3D). With no projection optics, there would be enormous light distribution blurring on the target (see left of FIG. 3D) so that in such cases finer structural resolutions caused by a purely refractive effect are impossible. With increased input angle divergences of approximately +/-6° close to the maximum angular limit achievable of +/-7° (etendue conservation), marked blurring effects caused by aberrations are visible (FIG. 3E). Nevertheless, these pattern smearing effects are smaller by orders of magnitude than for conventional single or two-area free-form beam shaping [Zwick, Feng, Ries, Oliker]. Thus, the cooperation of the two refractive free-form elements and the projection lens causes an enormous decrease in blurring effects. Detailed discussions of the main causes for the remaining structural blurring will be discussed further below referring to FIGS. 4, 5.

In order to generate sharp illumination patterns, additionally transmission-modulated structures 20a (like absorptive/reflective apertures, grey-scale filters etc.) may be used (see FIG. 3F). In FIG. 3F, the projection optics has been adjusted such that the ideal object plane for projection imaging is located between the first two free-form surfaces. Thus, the aperture structures 20a in FIG. 3F, left, are outside the ideal object plane of the projection optics/projection lens, which results in a fuzzy imaging of the aperture structure as a consequence of defocus. The aperture structures between the first two free-form lenses in contrast are imaged onto the target plane somewhat sharper. More aperture structures may serve for spurious and stray light minimization (see below FIGS. 9, 14-18). Due to the cooperation of refractive free-form beam shaping and transmission-modulated structures, sharp light patterns on the target can be achieved with, at the same time, high efficiency. The free-form beam shaping may generate an adapted illumination of the transmission-modulated structures so that the latter has to fade out only little light.

In the easiest case, the projection optics 12 include a spherical, conical or aspherical single projection lens which transfers an object light distribution (generated by free-form beam shaping or by aperture structures) to the target with a sufficient imaging quality. If the imaging quality is not sufficient, for example as a consequence of a large numerical aperture involved or color errors, a multi-surface projection objective may also be applied. In the case of "object light patterns" distributed in a complicated manner, and non-trivial target shapes, further free-form surfaces in the imaging projection optics are of advantage (see FIG. 5(e)).

FIG. 4 exemplarily illustrates the position of an effective virtual object pattern plane in free-form beam shaping of a single channel 6a. Relatively strongly divergent light 16a (see arrows in FIG. 4 bottom, nearly corresponds to the maximum angular spectrum for the considered array projector as a consequence of etendue conservation) impinges on the optical element and is redistributed by the input-side first two free-form surfaces 8a, 10a (see free-form surfaces in FIG. 4, wherein the remaining elements of the beam shaper/projector unit are not illustrated). When considering the real light distribution 13a directly behind the input-side second free-form surface in the plane 15a surrounded by a broken line, what can be recognized is an extremely blurred hardly identifiable light pattern (see grey-scale image 13a of the top most plane 15a surrounded by a broken line). Light blurring expresses the strong beam angle divergence. Starting from this real light pattern, all the light beams are extended in a backward direction corresponding to their beam direction, i.e. the features of virtual light patterns 13a", 13a" will be examined below. The light pattern selected for imaging (using the setting or shape of the projection optics) will then be the object light pattern 13a", 13a". What can be observed is the fact that, despite a strong input light divergence, there is a weakly blurred virtual object light pattern with an object position in the direction of the input-side first free-form surface in this example.

Imaging this virtual, minimally blurred object pattern plane to the target results in the sharpest possible light patterns with exclusive light redistribution and conventional imaging transformation (imaging from an object plane to an image plane). The position of the best object pattern plane can be controlled by a specific design.

Figure 5:
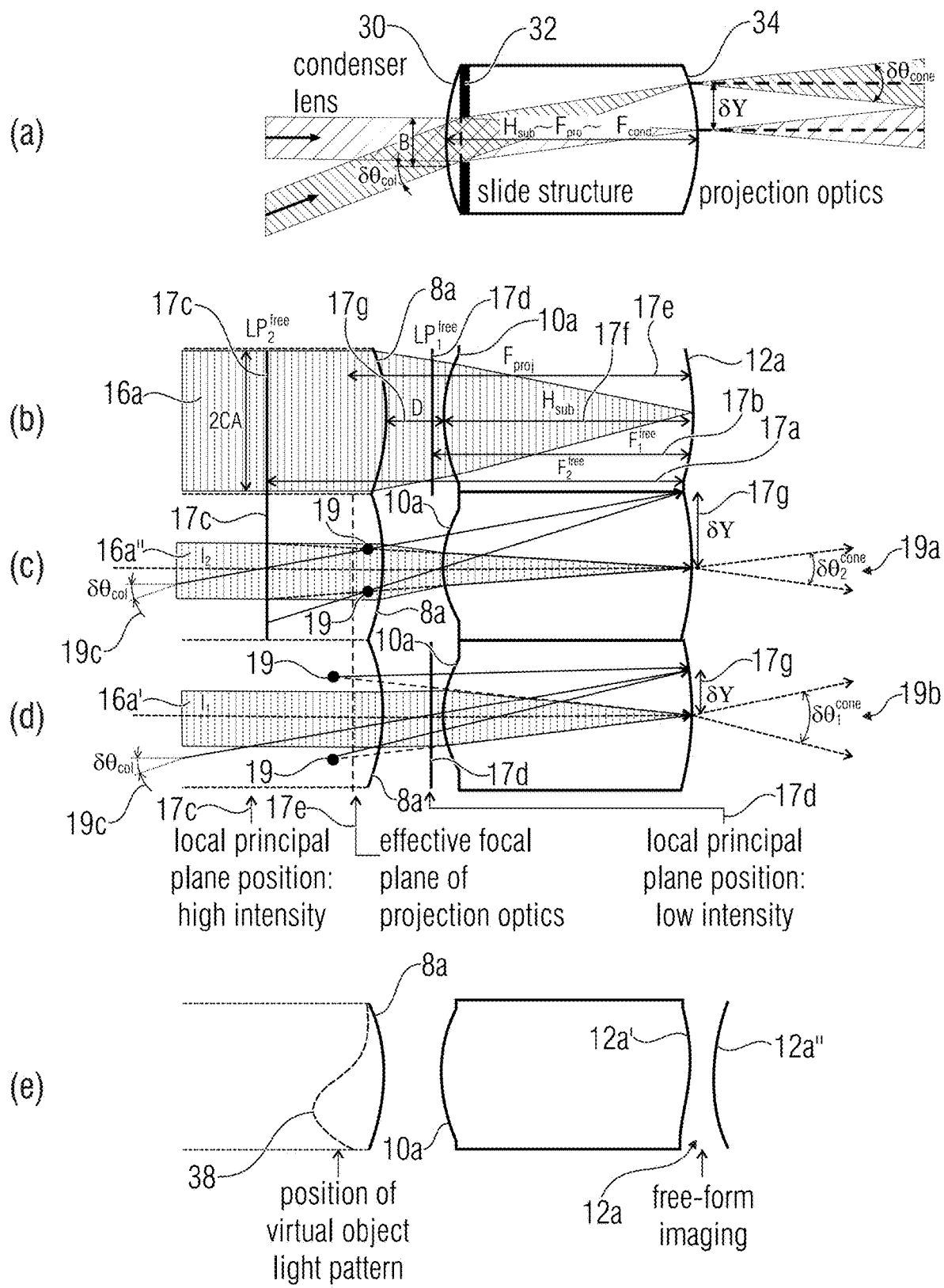
FIG. 5 is a schematic illustration of some characteristics of the free-form array projector with exclusive light redistribution using a simplified model and differentiation from a conventional array projector.

FIG. 5 illustrates some essential characteristics of the free-form array projector using a system with a target in infinity (far field). Coarse approximations of characterizing quantities are indicated by means of a simplified model and differences to conventional array projectors [DE 102009024894 A1, DE 102011076083 A1, Sieler] will be shown. With regard to the free-form array projector 2, exclusively refractive light redistribution processes (not making use of transmission-modulated structures) will be considered. In addition, the considerations will be limited to paraxial approximations, corresponding also to moderate light redistribution processes. This field of application of the free-form array projector can of course also be found beyond these approximations.

FIG. 5(a) shows a basic setup of a single channel of the conventional array projector with a right-side condenser lens 30, a subsequent slide structure 32 and a final projection lens 34. The lenslet comprise a free aperture CA and are located on a substrate having a thickness of ~$H_{sub}$ 17f. Collimated input light with a light divergence of $\delta\theta_{col}$ impinges on the condenser lenses. The condenser lenses operate in accordance with the Köhler illumination principle and approximately image the source distribution to the input pupil of the projection optics. For this special case illustrated in FIG. 5, for a paraxial approximation, this means that the right-side condenser focal length in the substrate material $F_{cond}'$ in magnitude approximately has to match the substrate thickness $H_{sub}$, $F_{cond}' \sim H_{Sub}$ (convention: see [Born-Wolf]). The result is a requirement to the collimation optics. In order to prevent cross-talk between the individual projector channels, a maximum input divergence angle of $\delta\theta_{col}^{max}$ of:

$$\delta Y \sim \delta\theta_{col}^{max} F_{cond} \cong CA \text{ and } F_{cond} \sim n_{sub} H_{sub} \quad (1)$$

may not be exceeded. $n_{sub}$ is a substrate refractive index. For generating predetermined irradiation intensity distributions E(x, y) on the target, slide structures are usually inserted shortly behind the condenser lenslet 30. The slide structures are imaged sharply onto the target by means of the projection lenslet. For the special case considered here of a target in the far field, the left-side focal length of the projection optics approximately has to match the substrate thickness $F_{pro} \sim H_{sub}$. Conventional aberrations when imaging $\delta\theta_{ab}^{pro}$ will result in image errors/blurring of the light distribution on the target:

$$\delta\theta_{blur} \sim \delta\theta_{ab}^{pro}. \quad (2)$$

With too strong aberrations of a single projection lens, in principle multi-lens arrangements may be used, which, however, results in much more complex optics.

A completely opened array projector, i.e. no transmission-modulated structures, will basically produce a constant irradiation intensity $\overline{E}$ (moderate field angle, neglecting the moderate irradiation intensity decrease). A complete redistribution of the power present $\overline{E}A_{targ}$ to a desired pattern irradiation intensity distribution $E_{ideal}(x, y)$, while approximating energy conservation, of:

$$\int\int_{Target} E_{ideal}(x, y)dxdy = \overline{E}A_{targ}. \quad (3)$$

would be desirable for illumination in an ideal case. $A_{targ}$ is the size of the target surface or area. Using the conventional array projector, such a power redistribution cannot be achieved since desired light patterns can only be generated by fading the light power. The maximum irradiation intensity can only be $\overline{E}$, which corresponds to complete light transmission. Thus, the irradiation intensity of a conventional array projector with the same topology as in Eq. (3) will be given by $E_{proj}^{conv}(x, y) = E_{ideal}(x, y)\overline{E}/\max(E_{ideal})$. The result is an approximation for the respective maximum power efficiency with patterned illumination:

$$Eff_{proj}^{conv} = \frac{\overline{E}}{\max(E_{ideal})}. \quad (4)$$

Very narrow, highly intense light pattern features indicate very large maximum values max ($E_{ideal}$) in the power-normalized irradiation intensity distribution and result in very small possible power efficiencies. These fine highly intense light patterns are achieved, for example, by a plurality of array channels having very small aperture openings B or by greater, stronger absorption regions of grey-scale filters. However, the maximum angle of acceptance of the optics, i.e. the necessitated light collimation $\delta\theta_{col}^{max}$, for all the possible channels will remain equal, i.e. Eq. (1) is not dependent on the desired light pattern distribution.

In the free-form array projector 2 to be presented here, the condenser lenslet in each array channel 6a is replaced by two respective free-form structures (see FIGS. 5(b), (c), and (d)). In FIG. 5, these free-forms are located on the output side and the input side of two substrates. In accordance with the Köhler illumination principle, both free-form surfaces generate a convergent bundle of light with ideally collimated incident light along the optical axis of the projection optics (see FIG. 5(b)). An irradiation intensity distribution on the target (or on an aperture plane) here is additionally made possible by means of a power redistribution within the convergent overall light bundle (see FIGS. 5(c), (d)). The light redistributions, while simultaneously considering beam angles, can be allowed by modifying corresponding free-form design methods [Michaelis, Feng, Rubinstein]. Apart from the mathematically more complex design methods, simplified model considerations may help to increase the understanding of the mode of functioning of the free-form array projector on the one hand and estimate characterizing quantities on the other hand.

In order to generate a light-intense partial structure on the target, the incident light 16a is compressed from a certain incident range (see $I_2$ 16a" in FIG. 5(c)) to a small output angle $\delta\theta_2^{cone}$. Regions of smaller irradiation intensity in contrast are generated by extending an input light sub-bundle (see $I_1$ 16a' in FIG. 5(d)) in a respective output light cone with $\delta\theta_1^{cone}$. Usually, such light redistribution regions will exhibit an infinitesimal size. For reasons of simplicity, both scenarios in FIGS. 5(c), (d) are illustrated precisely in the central region of an optics channel. Due to the effect of the two free-form surfaces, local focal lengths ($F_{1,2,3...}^{free}$ 17a, 17b) with a corresponding local principal plane ($LP_{1,2,3...}^{free}$ 17c, 17d) can be associated to each (infinitesimal) redistribution bundle. Subsequently, for simplifying the representation, the fact that different focal lengths may occur in different bundle section planes will be neglected. Light redistribution regions with light compression, i.e. increase in illumination intensity, will comprise greater effective focal lengths and a greater distance to the projection lens (see $F_2^{free}$ 17a and $LP_2^{free}$ 17c in FIG. 5(c)). This is reversed for light redistribution regions with bundle extension, i.e. decrease in illumination intensity (see $F_1^{free}$ 17b and $LP_1^{free}$ 17d in FIG. 5(d)). The effect of both free-form surfaces thus corresponds to generating light sub-bundles of different intensity, the bundle direction and size of the output light cones $\delta\theta_{1,2}^{cone}$ 19a, 19b of which are determined by the different local principal plane positions 17c, 17d (remark: for reasons of simplicity, only the right-side principal plane is considered here). The distribution of the different principal planes/focal lengths can be estimated roughly by:

$$F'_{free} \sim -H_{sub}^{mod} \sqrt{K(x, y)} \quad (5)$$

$$K(x, y) = \frac{E_{ideal}(x, y)}{\overline{E}}.$$

$K(x, y)$ is a measure of light redistribution. An irradiation intensity increase/decrease when compared to the mean value $\overline{E}$ is expressed in values of $K>1/K<1$. For homogenous illumination $\overline{E}$, the result is a focal length $F_{free}' \sim -H_{sub}^{mod}$, in analogy to the conventional array projector. In $H_{sub}^{mod}$, it is taken into consideration that, in accordance with FIG. 5(b), the overall light bundle already exhibits convergence starting from the first free-form 8a, i.e. generally a greater effective focal length is started with. $H_{sub}^{mod}$ is calculated from the refraction of light at the first and second optical areas with no light redistribution in correspondence with conventional refraction laws. The optics here has been implemented such that $H_{sub}^{mod}$ is basically made up of the substrate thickness $H_{sub}$ 17f and the distance D 17g of the first and the second refractive optical free-form surfaces. A plurality of approximations/idealization was applied for estimating (5), wherein, among other things, no potentially different focal lengths in different bundle section planes (principal sections) are considered.

In analogy to the conventional array projector (see Eq. (1)), estimations for the maximum allowable input divergence angles can be derived by means of Eq. (5). Since, with free-form redistribution, differently light-intense regions have different effective focal lengths and principal plane positions, respective light bundles, with inclined collimated radiation (see FIGS. 5(c), (d)), will be subject to differently large deflections 17g $\delta Y \sim \delta \theta_{col} F_{free} \sim \delta \theta_{col} n_{sub} H_{sub}^{mod} \sqrt{K}$ on the projection optics. FIG. 5(c) shows that light sub-bundles with greater an illumination intensity are deflected more strongly. In order to generally avoid cross-talk, deflections of light bundles with the maximum illumination intensity ($K_{max}$) may not exceed the free aperture. Thus, light redistribution will be connected to a reduced allowed input angle divergence $\delta \theta_{col}^{max}$ 19c in accordance with:

$$\delta Y \sim \delta \theta_{col}^{max} F_{free}^{max} \sim \delta \theta_{col}^{max} n_{sub} H_{sub} \sqrt{K_{max}} \approx CA \quad (6)$$

This expresses etendue conservation. For the small angle approximation considered, the measure of light redistribution $K(x, y)$ on the target approximately also corresponds to the light redistribution in the region of the free-form lenses (negligible projective, imaging-induced changes). Light redistribution may be considered to be mapping original transversal coordinates ($x_1$, $y_1$) to distorted coordinates ($x_2$, $y_2$) in accordance with the Jacobi matrix $\partial[x_2 y_2]/\partial[x_1 y_1] \sim K$ [Oliker, Sulman]. Due to the conservation of the phase space volume $dx_i dy_i dp_i dq_i = \text{const}$ [Winston], the respective transversal components of the beam vectors ($p_i$, $q_i$) will behave as follows: $\partial[p_2 q_2]/\partial[p_1 q_1] \sim 1/K$. Compressing the phase space in the location coordinates is also connected with an extension in the beam vector components. Consequently, using etendue conservation, an analog expression is obtained as in Eq. (6).

The light bundles with different power density contents generated by light redistribution start on the entrance surface of the first free-form 8a. Each infinitesimal light bundle interval precisely on the first free-form may thus be considered to be the input aperture for the respective light bundle. The incident light will impinge on this input aperture with a different incident direction $\delta \theta_{col}$. Imaging this input aperture with the respective effective local focal length $F_{1,2}^{free}$ results in a local light object sub-pattern of maximum sharpness, i.e., for each redistribution interval, the light with all its beam angles seems to originate from an effective light object sub-pattern. In FIG. 5, these light object sub-patterns have been characterized by bold dots 19. The position of all the light object sub-patterns with minimum blurring may be estimated by the respective imaging equation when imaging the effective input aperture. Measured from the input pupil of the projection optics, the result is a distance of $L_{obj} \sim -H_{sub}^{mod} - H_{sub}^{mod} (\sqrt{K}-1)^2/(2\sqrt{K}-1)$. The position of each light object sub-pattern depends on the measure of light redistribution K.

The virtual object pattern generated by light redistribution is to be imaged to the respective target (real or virtual) by the projection lens. With conventional imaging, usually an object plane (shell) is transferred to an image plane (shell). Since, however, the best object pattern with minimum blurring usually comprises an extension in the longitudinal direction as a consequence of locally varying focal lengths (see Eq. (5)), in a paraxial approximation, the best projection focal length 17e possible for far-field imaging will result by a suitable mean value:

$$F_{proj} \sim H_{sub}^{mod} + H_{sub}^{mod} \left\langle \frac{(\sqrt{K} - 1)^2}{2\sqrt{K} - 1} \right\rangle \quad (7)$$

$\langle . \rangle$ characterizes the respective adapted averaging procedure. Using Eq. (7), the reduction of a principal portion of blurring of the target light patterns for free-form redistributing optics can be estimated.

When using individual or conventional free-form optics for generating patterned illumination [Ries, Oliker, Michaelis, Rubinstein, Feng, Wu, Luo, Zhao] for collimated light incidence, blurring effects are mainly caused by remaining beam divergences $\delta \theta_{col}$ of the input light, i.e. the principal portion of the target distribution smearing will be in the order of magnitude of the remaining input beam divergence $\delta \theta_{div}^{main} \sim \delta \theta_{col}$. This original blurring principal portion, however, is reduced strongly by the optics arrangement presented here. FIGS. 5(c), (d) illustrate the remaining portion of target distribution smearing. Since differently intense virtual object portions are located in a differing distance to the projection optics focal length, different output angles will result for an input angle variation: $\delta \theta_{col}(|L_{Obj}| - F_{proj})/F_{proj}$, i.e. virtual object pattern portions close to the projector optics focal length will exhibit a strong reduction in blurring on the target:

$$\delta \theta_{div} \sim \delta \theta_{ab}^{proj} + \frac{|L_{Obj}| - F_{proj}}{F_{proj}} \delta \theta_{col} + \ldots \quad (8)$$

In addition, in the optics system described, further blurring effects may occur, like by shifting the illumination of the second free-form with a tilted collimated light incidence, for example.

The coarse estimation equations for the conventional array projector and for the free-form array projector will be compared below.

|  | Conventional array projector | Free-form array projector |
| --- | --- | --- |
| (I) right-side effective condenser focal length | $F_{cond}' \sim -H_{sub}$ | $F_{free}' \sim -H_{sub}^{mod} \sqrt{K(x,y)}$ |
| (II) left-side projection optics focal length | $F_{pro} \sim H_{sub}$ | $F_{proj} \sim H_{sub}^{mod} + H_{sub}^{mod}\left(\frac{(\sqrt{K}-1)^2}{2\sqrt{K}-1}\right)$ |
| (III) Max. collimation angle | $\delta\theta_{col}^{max} n_{sub} H_{sub} \cong CA$ | $\delta\theta_{col}^{max} n_{sub} H_{sub}^{mod} \sqrt{K_{max}} \cong CA$ |
| (IV) power efficiency | $\mathrm{Eff}_{proj}^{conv} = \frac{\overline{E}}{\max(E_{ideal})}$ | 1 |
| (V) measure of blurring effects for target distribution | $\delta\theta_{blur} \sim \delta\theta_{ab}^{pro}$ | $\delta\theta_{div} \sim \delta\theta_{ab}^{proj} + \frac{|L_{Obj}| - F_{proj}}{F_{proj}} \delta\theta_{col} + \ldots$ |

While, in the conventional array projector, as a consequence of light fading, no power efficiencies (see (IV) right) occur in many cases of application, high system transmission can be expected on principle using the free-form array projector, due to light redistribution. In special cases with exclusive light redistribution, system transmission of nearly 100% will be possible (see (IV) left). However, a patterned irradiation intensity generated by light redistribution $K(x, y) = E_{ideal}(x, y)/\overline{E}$ is at the expense of a limitation of the angle divergence of the incident light (see (III)). Consequently, with light redistribution, the incident light has to be collimated better than when using the conventional array projector. Improved collimation in turn can be obtained only with a greater lateral extension of the optics. This corresponds to etendue conservation. This means that not only an increase in light flux, but also the increase in power efficiency will be caused by an increase in the optics surface.

In conventional array projectors, an object structure (like a slide) with a predetermined fixed object position is imaged to the target by the projection lens. However, for a light redistribution pattern, different illumination intensities seem to originate from different longitudinal positions or object positions (see (I)). This means that, with conventional imaging (of an object plane (shell) to an image plane (shell)), a most suitable, mean object width has to be applied (see (II)). The result is that, when compared to conventional free-form light redistribution [Ries, Oliker, Michaelis, Rubinstein, Feng, Wu, Luo, Zhao], a reduction, but not an elimination of the pattern blurring effects is obtained (see (V)).

A further reduction of the pattern blurring effects can be achieved by adapting the imaging characteristics of the projection optics. Since the effective object light pattern comprises a non-trivial extension in the longitudinal direction (see FIG. 5(e)), i.e. is located on a free-form surface 38, projection optics 12a having one or several free-form surfaces 12a", 12a" are needed in order to achieve sharp imaging on the target. In other words, the projection optics 12a may comprise at least one further refractive optical free-form surface 12a", 12a" configured to correct an imaging error (like blurring effect) or a plurality of imaging errors in a projected image. The imaging errors may, for example, be caused by the fact that the object light pattern is not located in a plane, but on the free-form surface 38 and thus may be placed by the object plane of the projection optics (with no further free-form surfaces), on average, at most to the free-form surface 38 or close to the object light pattern.

A key component of the new illumination concept is an array of two coupled refractive free-form surfaces where both the radiation intensity distribution (or illumination intensity distribution) and the beam directions are controlled. In literature, the typical solution approach is determining suitable ray mapping, for example using a variation problem, and subsequently calculating the surfaces of the free-form surfaces using said mapping [Rubinstein, Feng].

An alternative, relatively easy method which is based on a Cartesian oval representation of the free-form surfaces and which adapts some ideas of the sufficiently known solution approach "supporting paraboloid" by Oliker will be presented below. In this method, a single free-form is represented by a discrete set of Cartesian oval segments, wherein a common focus is located on the source structure. The other Cartesian oval foci are distributed to the illumination target (projection surface), i.e. they are used for discretizing the target distribution. This is why the focus parameters of all the surfaces or area segments are established. Each segment still comprises a free parameter—the parameter of optical path length which is a measure of the distance between the source point and the element or a measure of the element thickness. A change in these parameters results in a change in the power distribution at the target location. Due to the fact that the path length parameter is determined, certain target distributions can be realized using a single free-form surface. These parameters of optical path lengths can be determined using an algorithm suggested by Oliker [Oliker].

Figure 6:
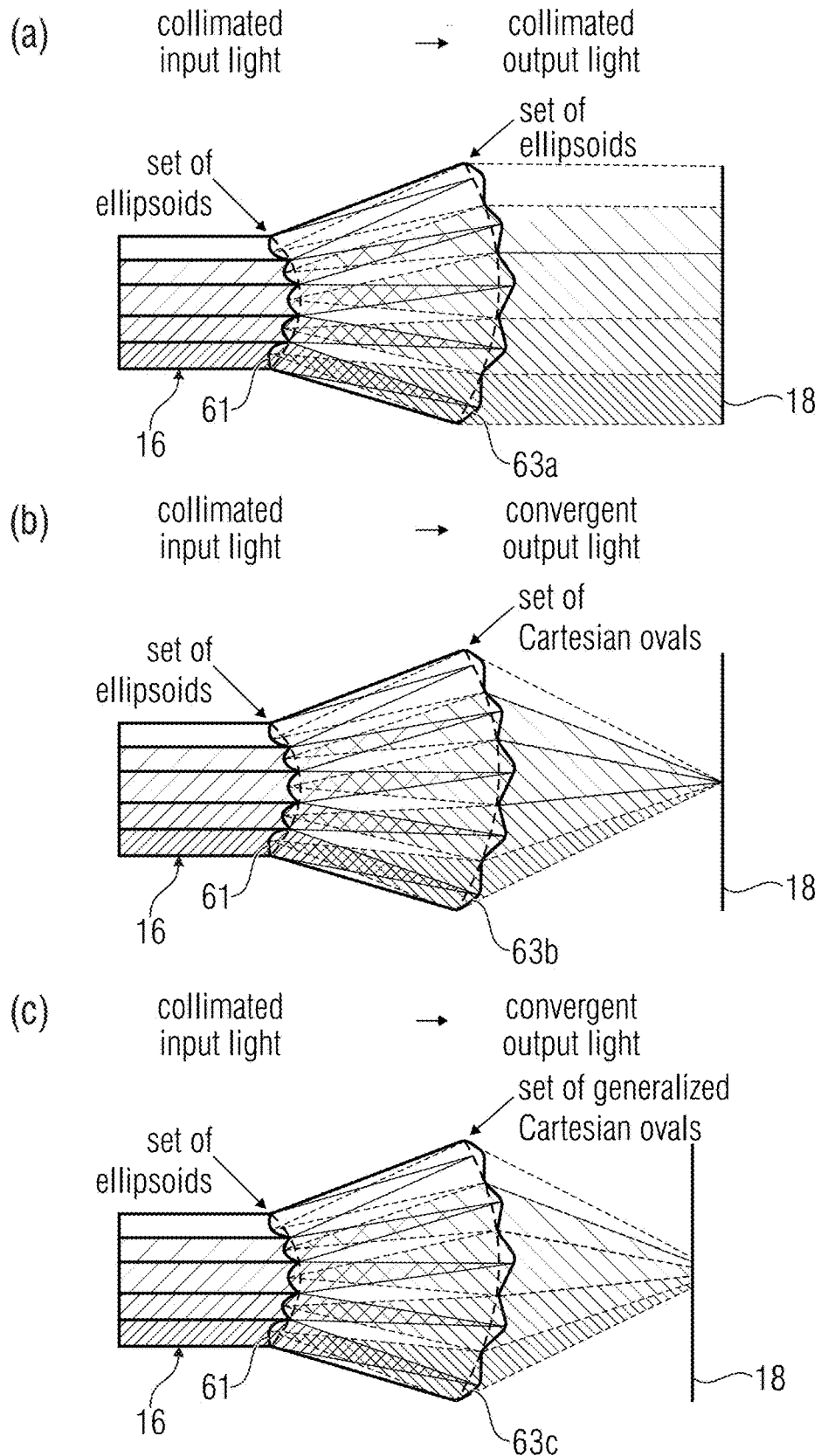

In order to additionally control the beam directions, a second free-form is used. Laser beam shaping can be considered to be one of the best known examples of such a free-form light redistribution [Shealy]. In this case, a laser beam collimated in an ideal manner, having a certain input intensity distribution, can be transferred to a collimated output beam having a desired target intensity while using two free-form surfaces. The light redistribution may be explained as follows. The first free-form generates the desired output intensity pattern exactly at the second free-form surface. Of course, the impinging beams cannot be collimated there since beam direction changes are used for light redistribution. Thus, the second free-form changes the beam direction by means of refraction in a suitable manner. These explanations will now be combined with the method of Cartesian oval representation. In order to generate a desired intensity distribution at the second free-form, the first free-form surface has to be decomposed by ellipsoids/conics, where the relevant foci are located exactly at the second free-form. In order to collimate the power collected by each input segment, a second ellipsoid/conical segment is used at the second free-form surface. The associated foci have to be placed exactly at the corresponding first free-form. Thus, both the entrance and the exit surfaces are decomposed at a discrete set of ellipsoids/conics 61, 63*a*, wherein an individual input segment is associated to a certain output segment and the respective foci are located at the respective associated counterparts thereof (see FIG. 6(*a*)). The specific shape of the double free-form element is dependent on the wavelength parameters of each segment pair. These parameters are determined iteratively. A first assumption for the shape of the second free-form is started with. After that, the path length parameters of the input segments 61 are obtained, as is the case with a single free-form. The overall path length of each segment pair will now be different among one another. This information can be used to change the path length parameter of the output segments 63*a*. The result is a new shape for the second output free-form. This procedure will be repeated until there is convergence. By changing the type of discretizing basic elements, different situations of an angular distribution can be realized. If the ellipsoid representation at the input surface is maintained and the ellipsoids on the output face are replaced by conventional Cartesian ovals 63*b*, the result will be a radiation intensity distribution (or illumination intensity distribution) with a converging beam bundle (see FIG. 6(B)). Non-trivial distributions of the beam directions can be obtained using generalized ovals 63*c* (see. FIG. 6(C)). Smooth free-form surfaces are generated using a sufficiently high number of discretizing elements.

In other words, the first refractive optical free-form surface 8 can be implemented to perform a spatial light redistribution and/or controlling of the beam angles of light beams emitted by the light source. Alternatively or additionally, the second refractive optical free-form face may be configured to guide light beams to the projection optics 12 in a convergent manner pursuant to the Köhler illumination, wherein the first and second refractive optical free-form surfaces influence each other.

Figure 7:
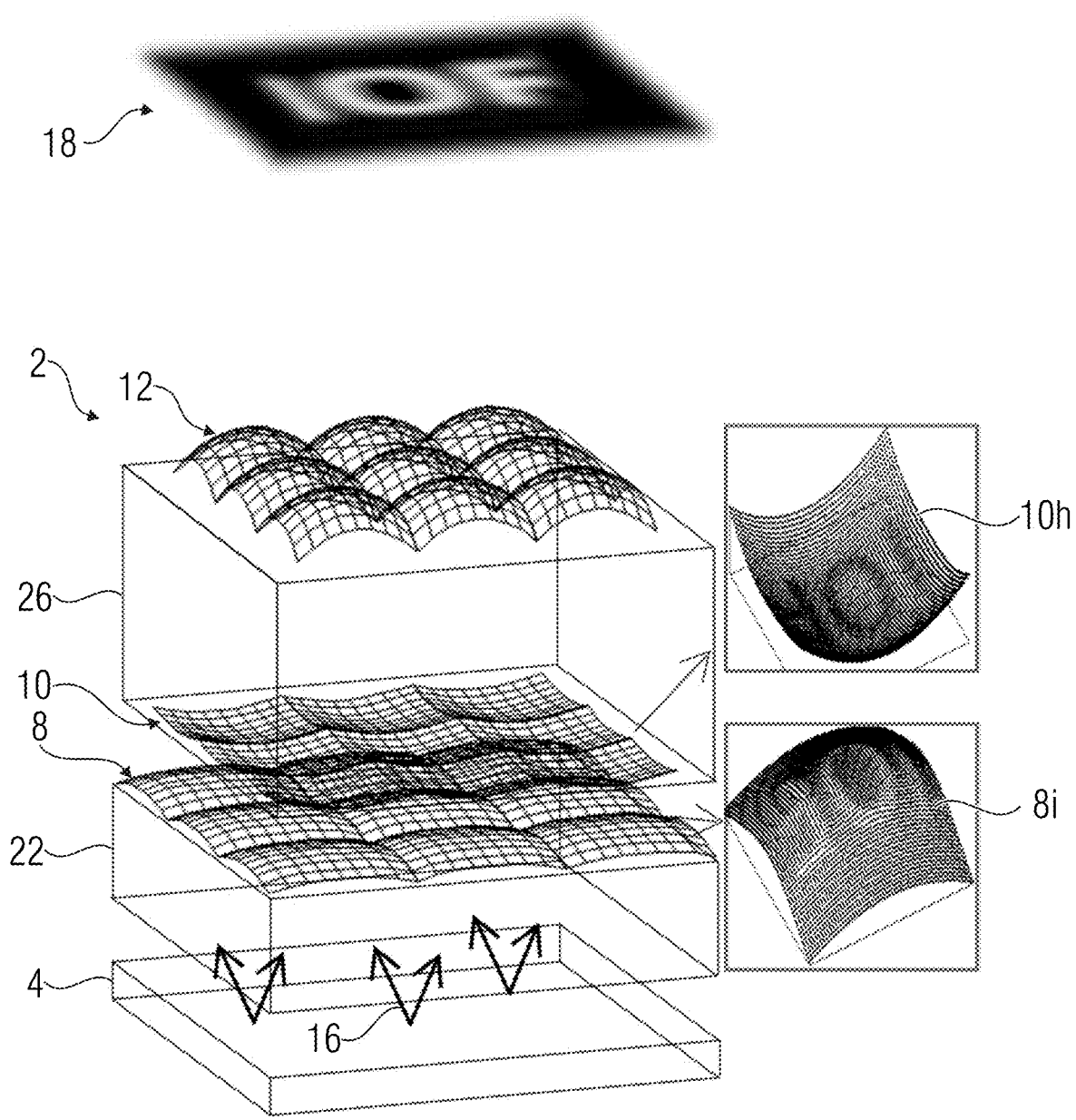
FIG. 7 is a schematic illustration of the projection device (or a free-form array projector) with no transmission-modulated structures (like absorptive apertures etc.) as a generalization of the conventional honeycomb condenser wherein right-side insets show the surface profiles of two illumination free-forms of an optics channel.

FIG. 7 shows a schematic portion of a free-form array projector 2 in accordance with FIG. 2, however with no transmission-modulated structures (like absorptive apertures etc.). Such optics may also be considered to be a generalization of the honeycomb condenser [WAKO], where the condenser array surface has been replaced by two free-form array surfaces. Generating a target light pattern is done exclusively by a refractive free-form light redistribution for generating a patterned, usually virtual light distribution within a channel and the imaging thereof onto the target by the projection lens. The advantage of such an arrangement is that, in the ideal case, a 100% transmission can be obtained for completely reflective surfaces. Additionally, the optics operates close to etendue conservation. However, even when using projection optics of high resolution, very sharp light distributions on the target cannot be generated since the refractively generated light distribution comprises aberrations. This aberration-caused blurring usually increases with an increasing input angle divergence, i.e. when approximating the potentially approximately possible etendue conservation (see FIGS. 3D and 3E). In addition, with such arrangements, stray light may form also at the transitions between the individual channels (caused by manufacturing-caused shape deviations, for example). Such free-form array projectors or free-form honeycomb condensers are thus used for applications with rather smooth target images and in the case of a certain stray light tolerance.

Figure 8:
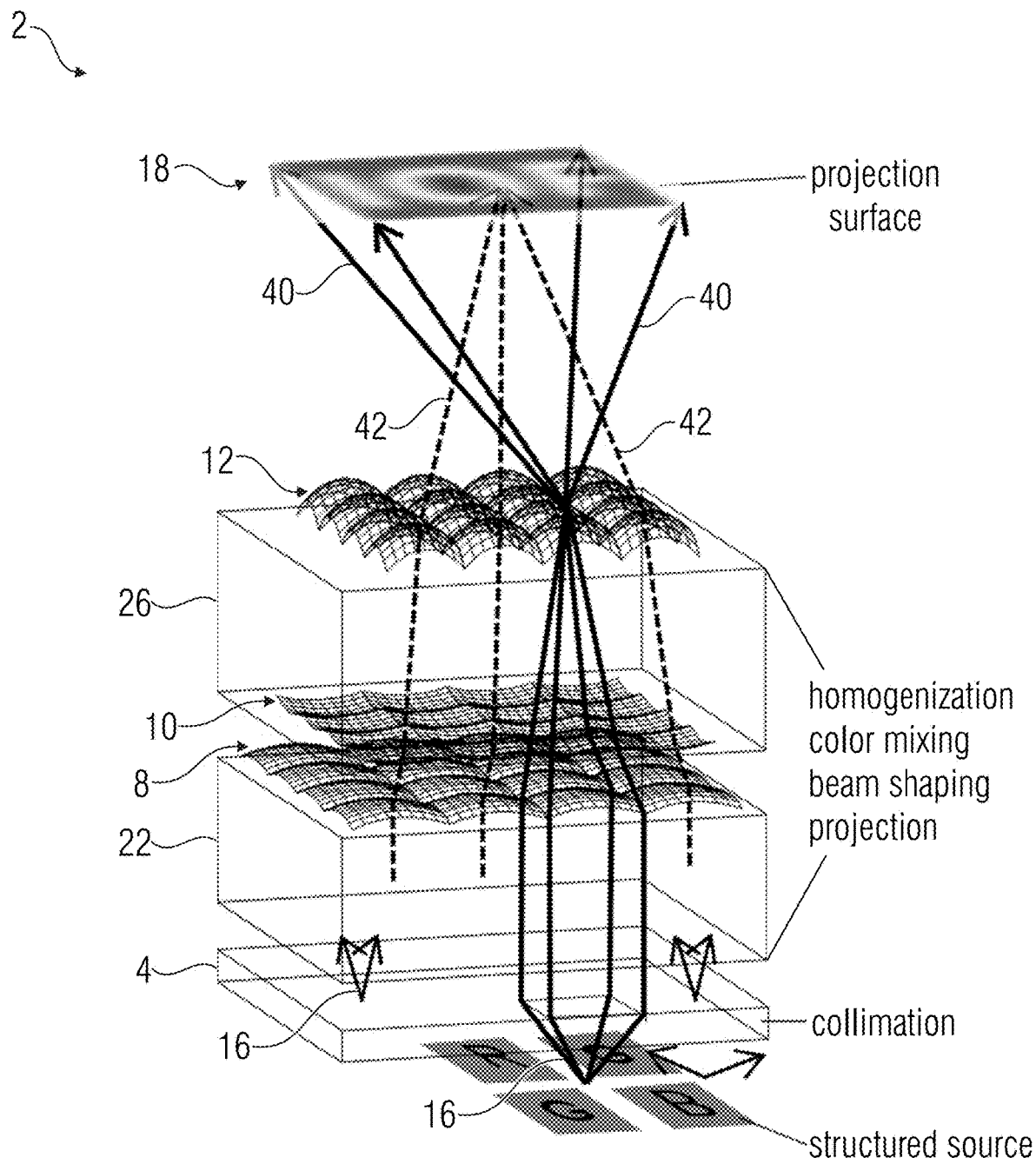
FIG. 8 is a schematic illustration of the free-form array projector for illustrating the Köhler illumination and mixing and homogenization effect when there are one or several, homogeneous or structured and monochromatic, polychromatic or white-radiating light sources (in this case exemplarily a multi-chip RGGB source)

FIG. 8 schematically illustrates the mixing and homogenization effect of the free-form array projector of FIG. 5 (source light homogenization/color mixing etc.). The source light 16 may originate from one or several, homogenous or structured and monochromatic, polychromatic or white-radiating light sources. Very frequently, sources are spatially strongly patterned, but exhibit a rather continuous light distribution in the angular space. For this reason, the Köhler principle for illumination is employed advantageously, wherein source angle distributions are transferred to spatial target positions. The thick continuous arrows 40 in FIG. 8 exemplarily illustrate this mode of functioning. In analogy, the Köhler illumination principle is easily visible in FIG. 3. Due to the array characteristic, the total considered source angle divergence is additionally divided into a plurality of sub-intervals which are superimposed on the target surface (see broken arrows 42 in FIG. 8). This allows achieving further light mixing. For the free-form array projector, this arrangement has a further implication. In order to generate a sufficiently good refractive light redistribution, the input light distribution has to be well-known. For small angle intervals, this distribution can be considered to be quasi-homogenous.

Figure 9:
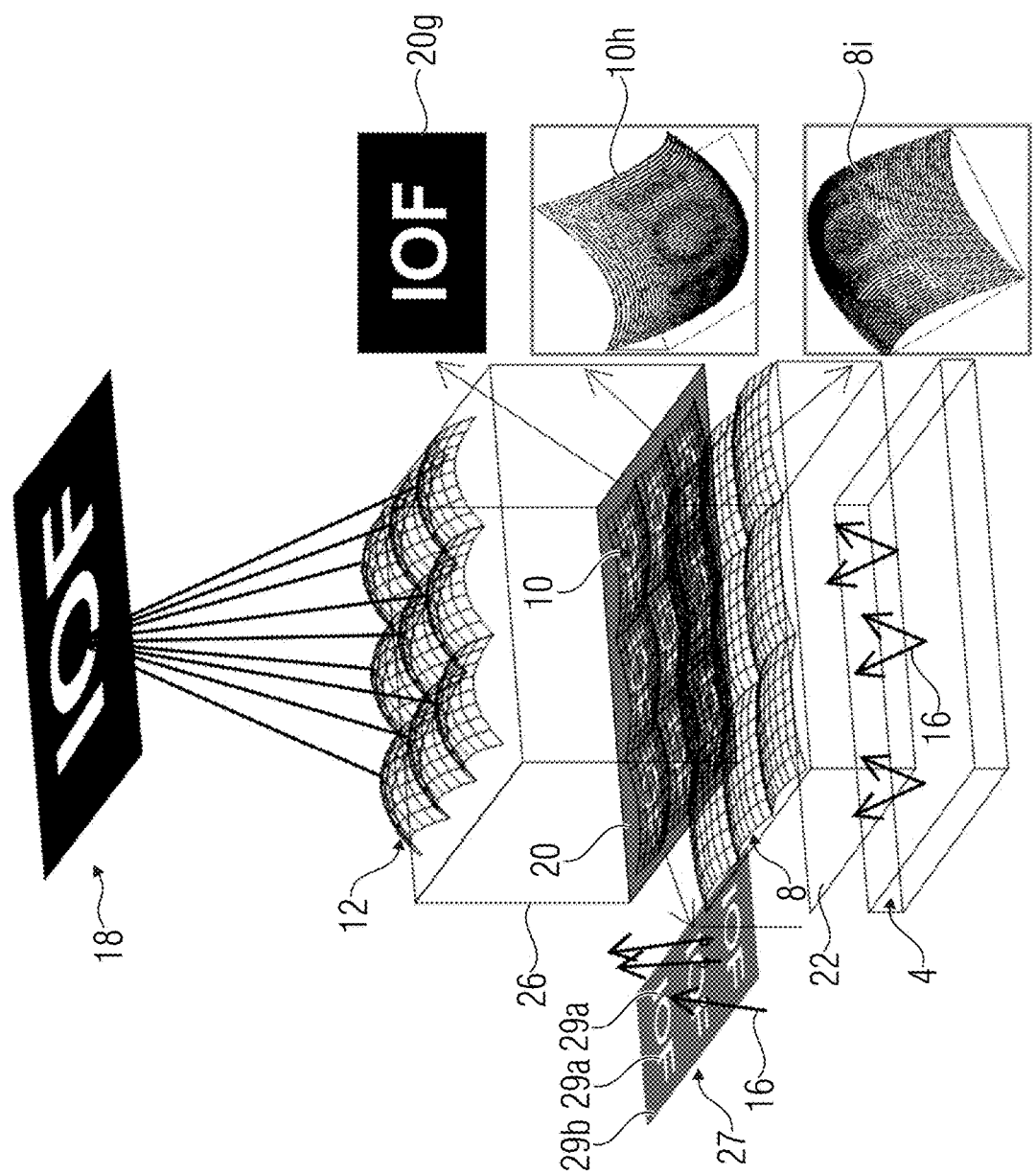
FIG. 9 is a schematic illustration of the free-form array projector in accordance with an embodiment for generating target patterns at very high a spatial frequency and also higher system transmission caused by the cooperation of free-form light redistribution, absorptive/reflective light fading and imaging, wherein the right-side insets show, for one channel, an absorptive aperture and surface profiles of both illumination free-forms and the left-side inset shows that the light beams propagate through the aperture openings, as a consequence of light redistribution.

In order to obtain both target patterns with very high spatial frequencies and also high optical system transmission, refractive free-form beam shaping and absorptive/reflective light fading can be combined. FIG. 9 illustrates the mode of functioning of such an optical element. The refractive free-form beam shaping here is used to propagate a majority of the light through the aperture structure and additionally transfer the light onto the projection lens (for example, in accordance with the Köhler illumination principle). Both illumination free-forms thus generate a real spatial light pattern adapted to the apertures and at the same time control the beam angles for ensuring the Köhler illumination principle. The thick arrows 16 of the left inset 27 of FIG. 9 illustrate that the light beams are guided through the aperture structures. The aperture structure is located in the ideal object plane/object space of the projection optics and will consequently be imaged sharply onto the target, i.e. in contrast to FIG. 7, a sequence of letters having very sharp structural edges will form. In other words, the transmission-modulated structure 20 can form the object light pattern based on the increased irradiation intensity in the light-transparent region 29*a* of the transmission-modulated structure 20. Thus, the cooperation of transmission-modulated structures and free-form light redistributions can form the object light pattern. In addition, the projection optics 12 can image the object light pattern from the transmission-modulated structure in order to obtain illumination of the object light pattern in the image surface of the projection optics.

Figure 10:
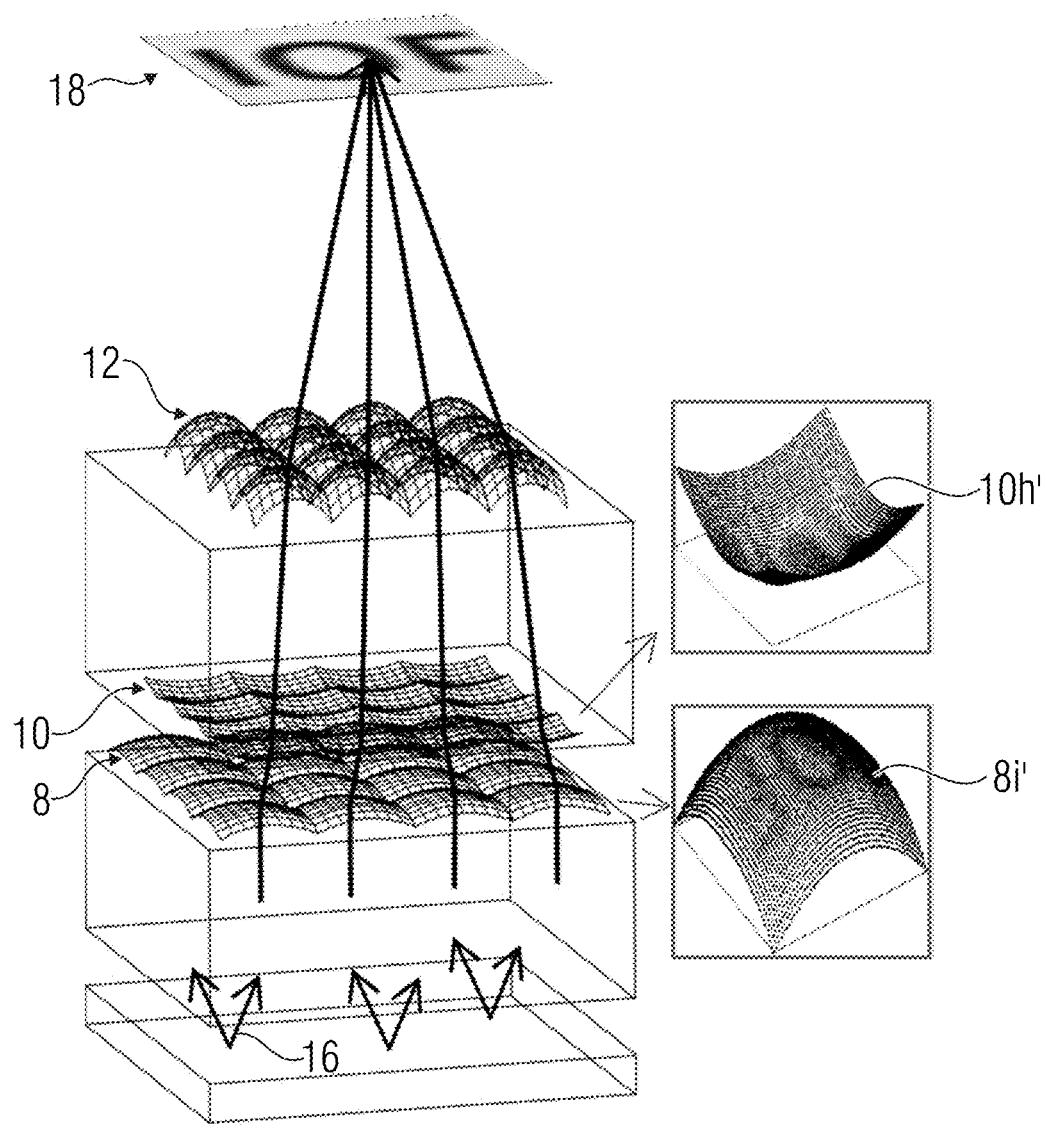
FIG. 10 is a schematic illustration of the projection device for generating target light patterns by refractive light redistribution with inverse contrast conditions when compared to FIG. 7.

FIG. 10 shows that, when compared to FIG. 2, inverse light patterns can be generated by purely refractive effects. Here, a dark sequence of letters was generated on a bright background by refractive free-form beam shaping and subsequent projection. Indentations and bulges in the insets 8*i*' and 8*i*'' and 10*h* and 10*h*'' are exchanged here.

Figure 11:
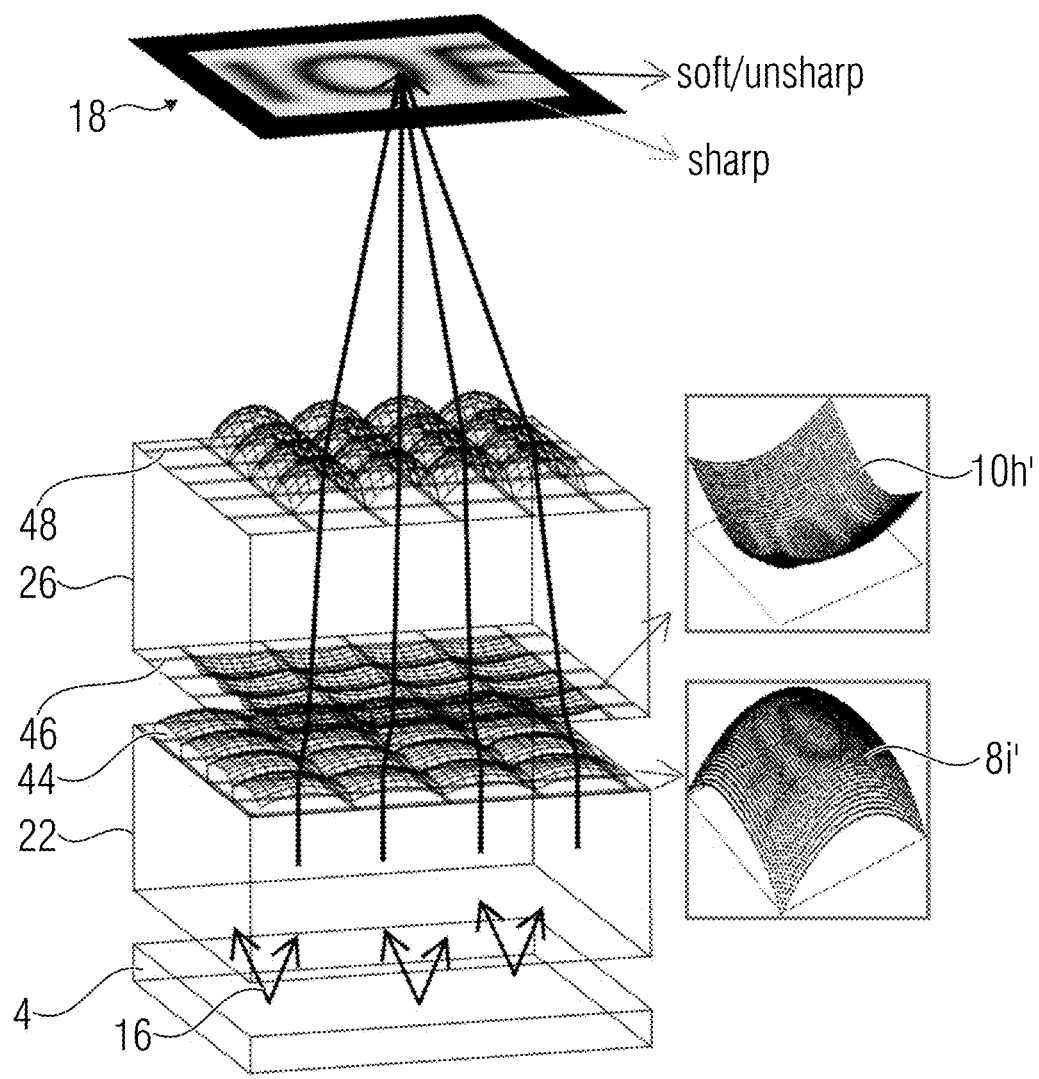
FIG. 11 is a schematic illustration of the free-form array projector having additional aperture structures (aperture layers/aperture walls) for minimizing scattering and stray light as a consequence of potentially discontinuous channel transitions, spurious edges, dead zones, insufficient collimation of input light etc.

Manufacturing-caused non-ideal transition regions between the individual array channels, like spurious edges, dead zones etc., may result in stray and scattering light. In addition, insufficient light collimation may also be connected to stray and scattering light outside the acceptance angular region of the array optics, resulting in cross-talk between the individual optics channels and, consequently, in ghost images close to the target illumination. In order to minimize such spurious effects, further absorptive/reflective structures can be introduced. These may be both aperture layers and insulating aperture walls between the individual channels. FIG. 11 exemplarily shows particularly simple aperture arrangements. Apertures 44 in front of the first free-form array may be used for covering non-ideal transition regions between the individual channels. In particular, such apertures are very helpful with non-continuous or non-continuously differentiable transitions of the ideal optics surface. Similar things apply to apertures 46, 48 between the two free-form arrays or shortly behind the second free-form arrays. However, such apertures may also exhibit a double function when the object plane of the projection imaging optics is close to the apertures. In this case, both stray light minimization and sharp target pattern details can be effected by the same aperture structure. Apertures between the projection array and the second free-form array in contrast may rather serve for minimizing channel cross-talk. In other words, the projection device may comprise at least one further transmission-modulated structure 44, 46, 48 which suppresses stray and/or scattering light.

Superimposing all the light distributions of all the channels onto one another results in the desired target light distribution. Optionally, all the channels may generate the same target light distribution (see FIGS. 2, 8-11 and FIG. 12, left) and thus allow a maximum degree of homogenization. However, different channel types may also cause different target illuminations 50a, 50b (see FIG. 12, right) and only superimposing all the light distributions on the target will generate the desired shape of the final distribution. This is particularly practical when very high emission angles are used for completely illuminating the target. Different channels types with smaller numerical apertures may cover different regions of the target. Different optics regions will comprise topologically different transmission-modulated structures and illumination free-forms. Area-dependent, qualitatively different imaging optics of the projection unit may also occur in order to consider strongly differing imaging directions or qualitatively different positions of virtual object light patterns, for example. By means of skillful channel superimposing, the requirements to the individual channels, in particular to the illumination free-forms, may be eased.

Figure 13:
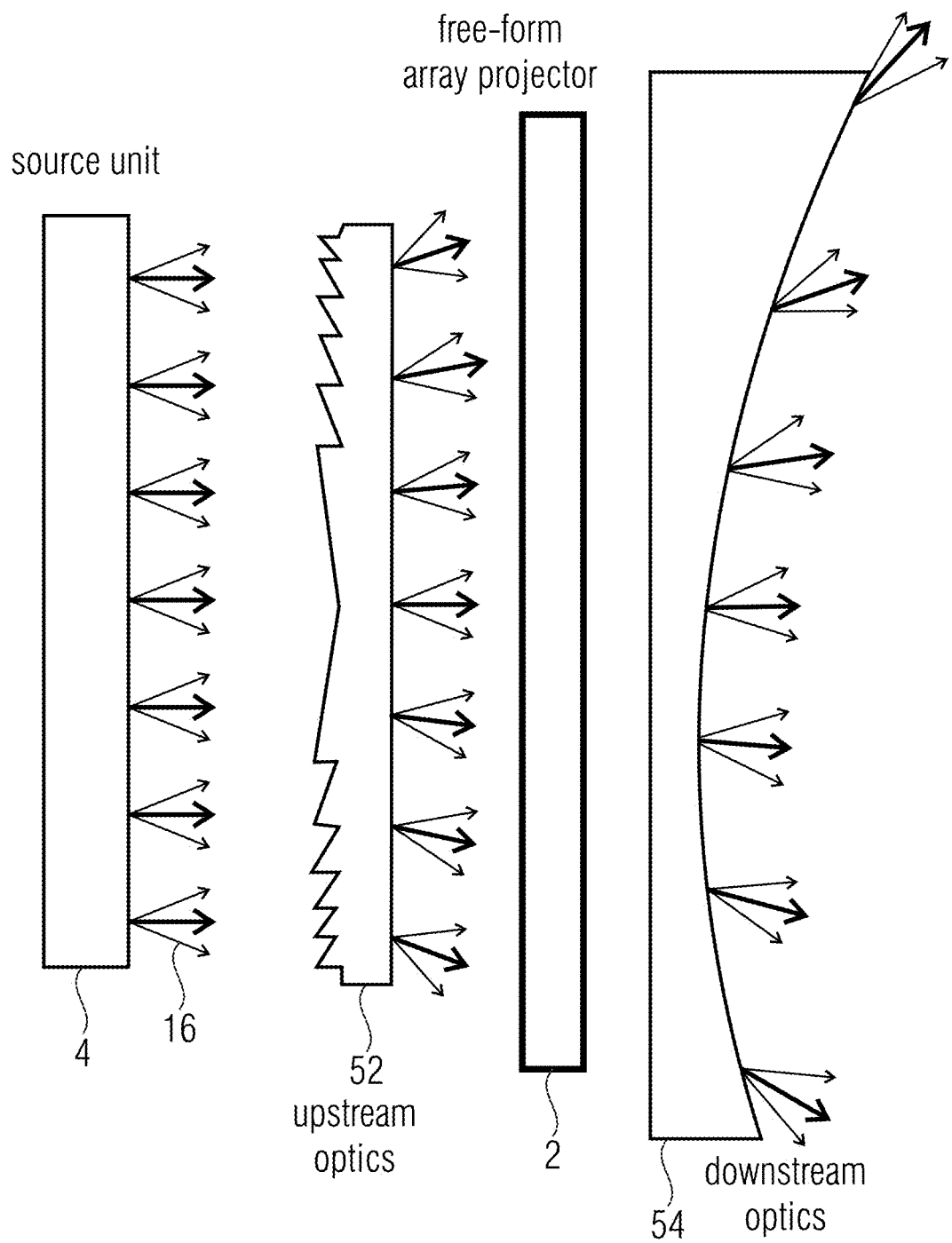
FIG. 13 is a schematic illustration of the free-form array projector having downstream and upstream additional optical surfaces/free-form surfaces, common to all/some channels, for adapting the principal radiating directions of the individual channels to the target distribution used.

FIG. 13 shows a schematic of the projection device 2 comprising further optical structures between the light source 4 and the first refractive optical free-form face and further optical structures behind the projection optics in accordance with an embodiment. The array of optical channels between the light source 4 and the first refractive optical free-form surface 8 and/or behind the projection optics 12 made up of at least two channels comprising a common refractive optical structure 52, 54 configured to set a principal beam angular distribution of the optical channels predominantly by light redistribution. With predominant light distribution, at least 50%, at least 65% or at least 80% up to 100% of the principal beam angular distribution is achieved by means of light redistribution, wherein the remaining portion is exemplarily obtained by means of fading. In order to adapt the principal radiation directions of the individual channels individually to the target distribution used, additional optical surfaces/free-form surfaces 52, 54 having the same effect for at least some channels may be placed upstream and/or downstream of the free-form surface projector. These may be smooth optics or Fresnel structures. The additional optics are to be configured such that a target distribution is achieved predominantly by light redistribution and only to a limited degree by lossy light fading. Free-form optics are usually used here. The free-form characteristic of the additional optics is to be explained using a simple example. For reasons of simplicity, optics downstream of the free-form array projector will be considered. In analogy to what has been mentioned above, (x, y) are the transversal coordinates of a planar target with a normal in the z direction. A target power distribution dP/(dx dy) is to be achieved. For a free-form array projector having individual projectors at the locations ($x_p$, $y_p$, z=const), for reasons of simplicity, exclusively principal beams having transversal radiation direction cosines ($\alpha$, $\beta$) will be considered. In addition, the projector coordinates are to be understood to be continuous variables. The projectors may be described in an approximate manner by a power density $\pi(x_p, y_p, \alpha, \beta) = dP_{pro}/(dx\, dy\, d\alpha\, d\beta)$. It is assumed that the additional optics generates a transformation of the following type: (x, y)=F($x_p$, $y_p$, $\alpha$, $\beta$) or ($x_p$, $y_p$)=G(x, y, $\alpha$, $\delta$). The target power density can be expressed by:

$$\frac{dP}{dxdy} = \int \pi(G(x, y, \alpha, \beta), \alpha, \beta)\frac{\partial[x_p, y_p]}{\partial[x, y]}d\alpha d\beta \qquad (9)$$

As is frequently usual, the free-form is described by a used mapping corresponding to a Jacobian $\partial[x_p, y_p]/\partial[x, y]$.

Figure 14:
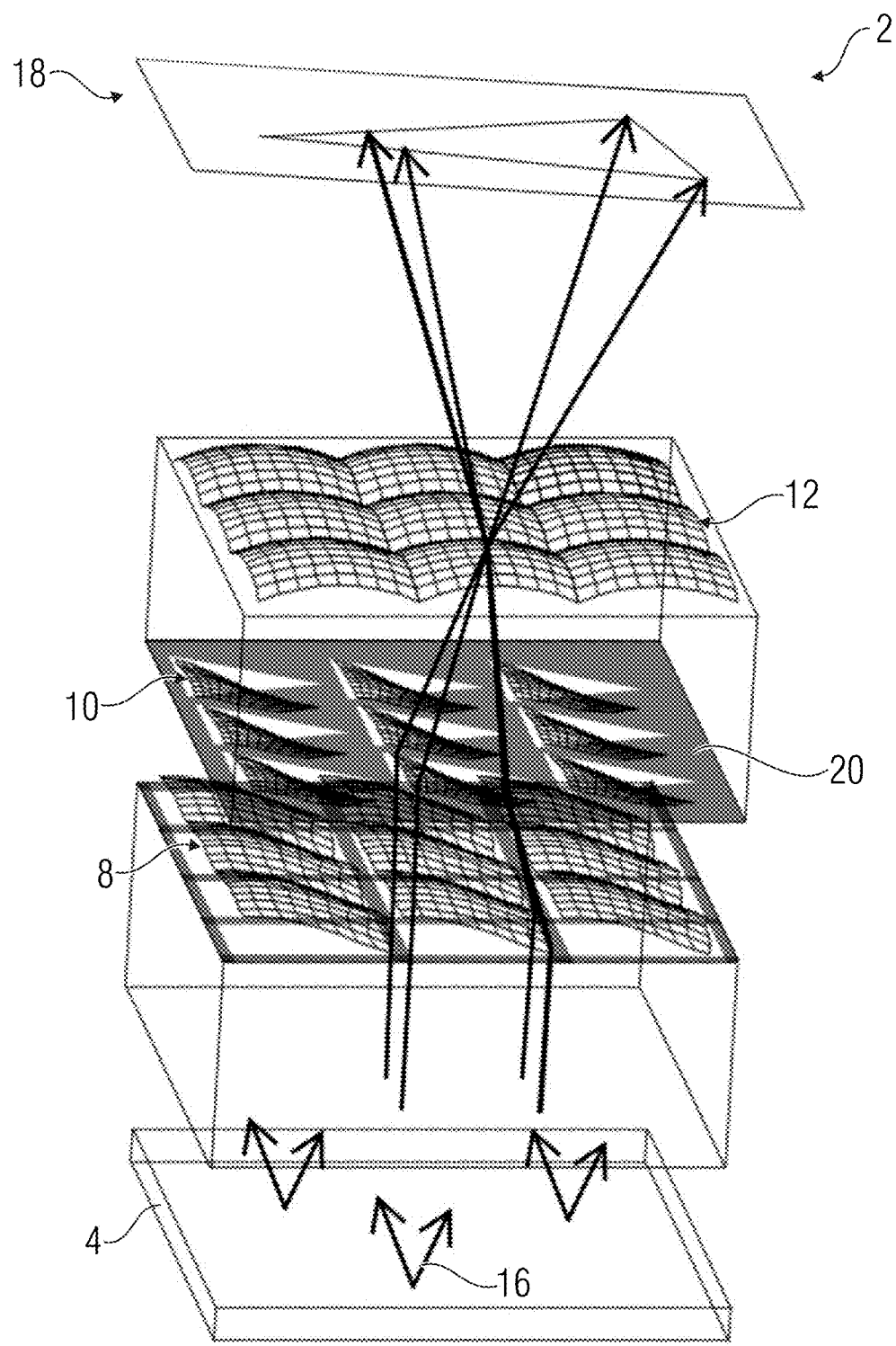
FIG. 14 is a schematic illustration of the projection device for generating a triangular target distribution with no addition background illumination by free-form redistribution, wherein the strong asymmetry in the power distributions is achieved by a marked blaze characteristic (prism shape) of the free-forms, which, however, results in strong discontinuities of the optics surface at the transition between different channels and uses aperture structures for stray light minimization.
Figure 15:
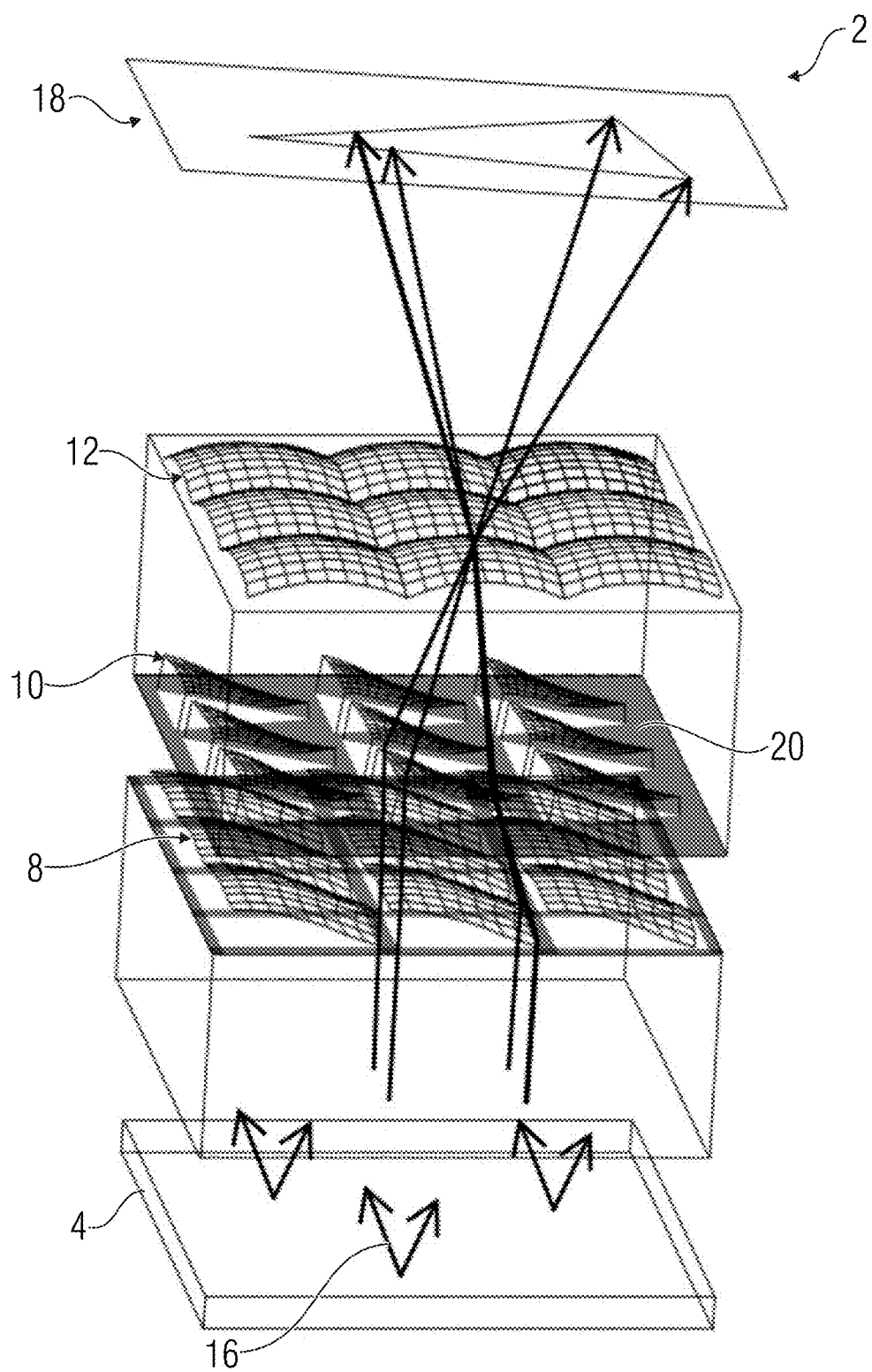
FIG. 15 shows the projection device of FIG. 14 having apertures between the first two free-form surfaces on the input side.
Figure 16:
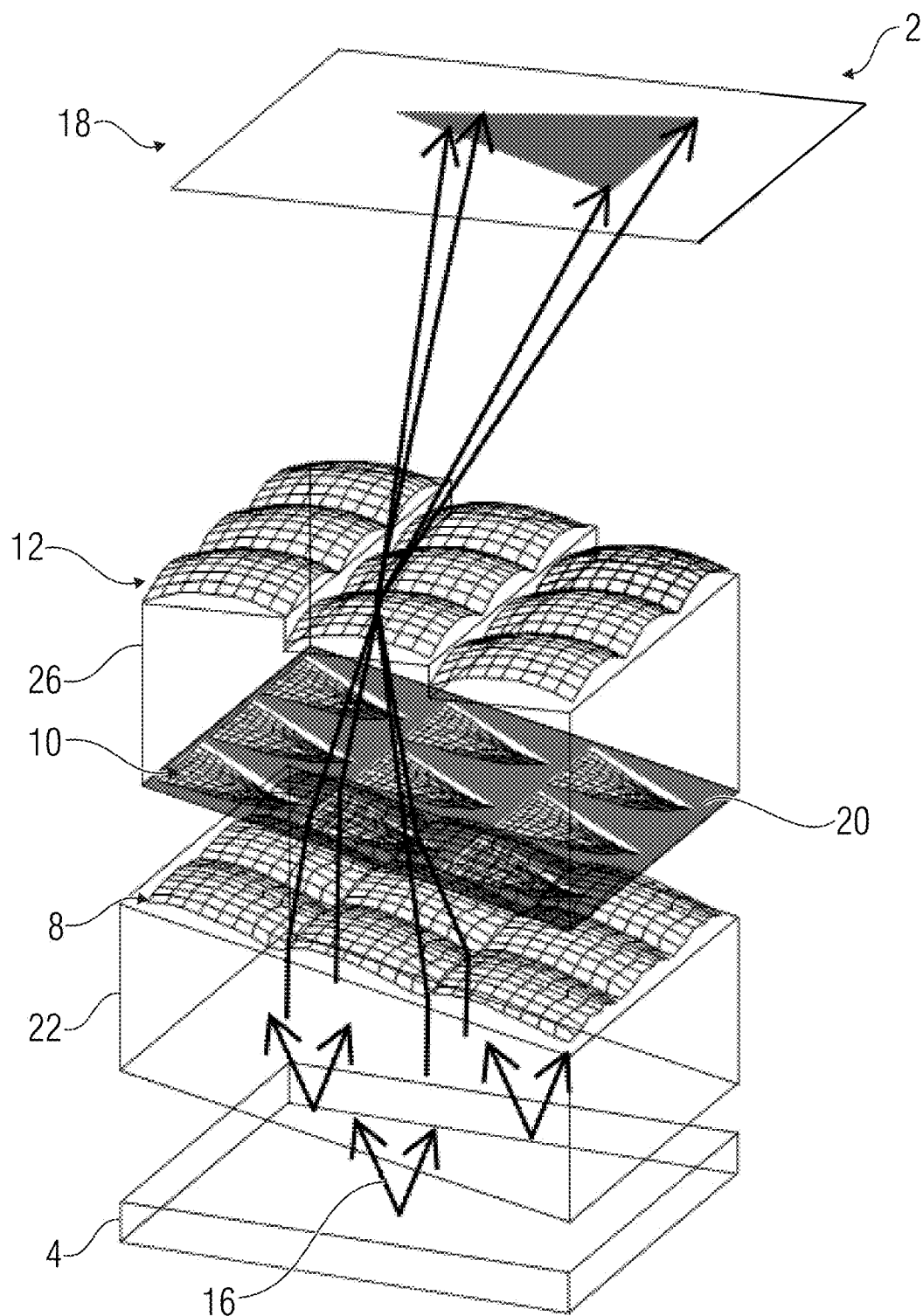
FIG. 16 is a schematic illustration of the free-form array projector, wherein the first two free-form arrays on the input side are arranged on inclined planes and the projection lens array is arranged on a stepped structure; this allows strongly minimizing the discontinuities/steep transitions between the channels of the free-form arrays, used with asymmetrical light distributions, which makes manufacturing considerably easier.
Figure 17:
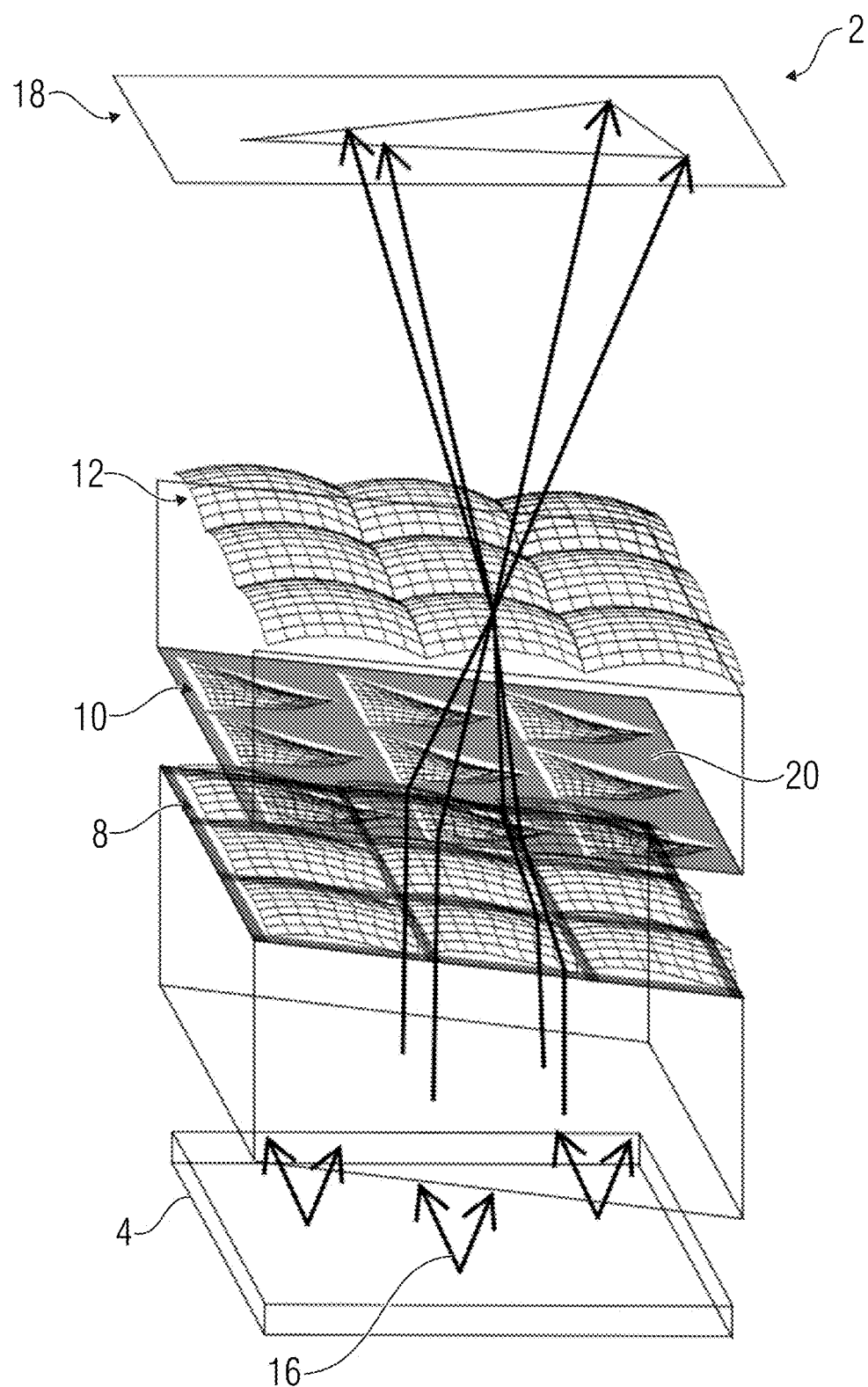
FIG. 17 shows the projection device of FIG. 16 having a projection lens array on an inclined plane and additionally introduced apertures on the first substrate for stray light minimization.
Figure 18:
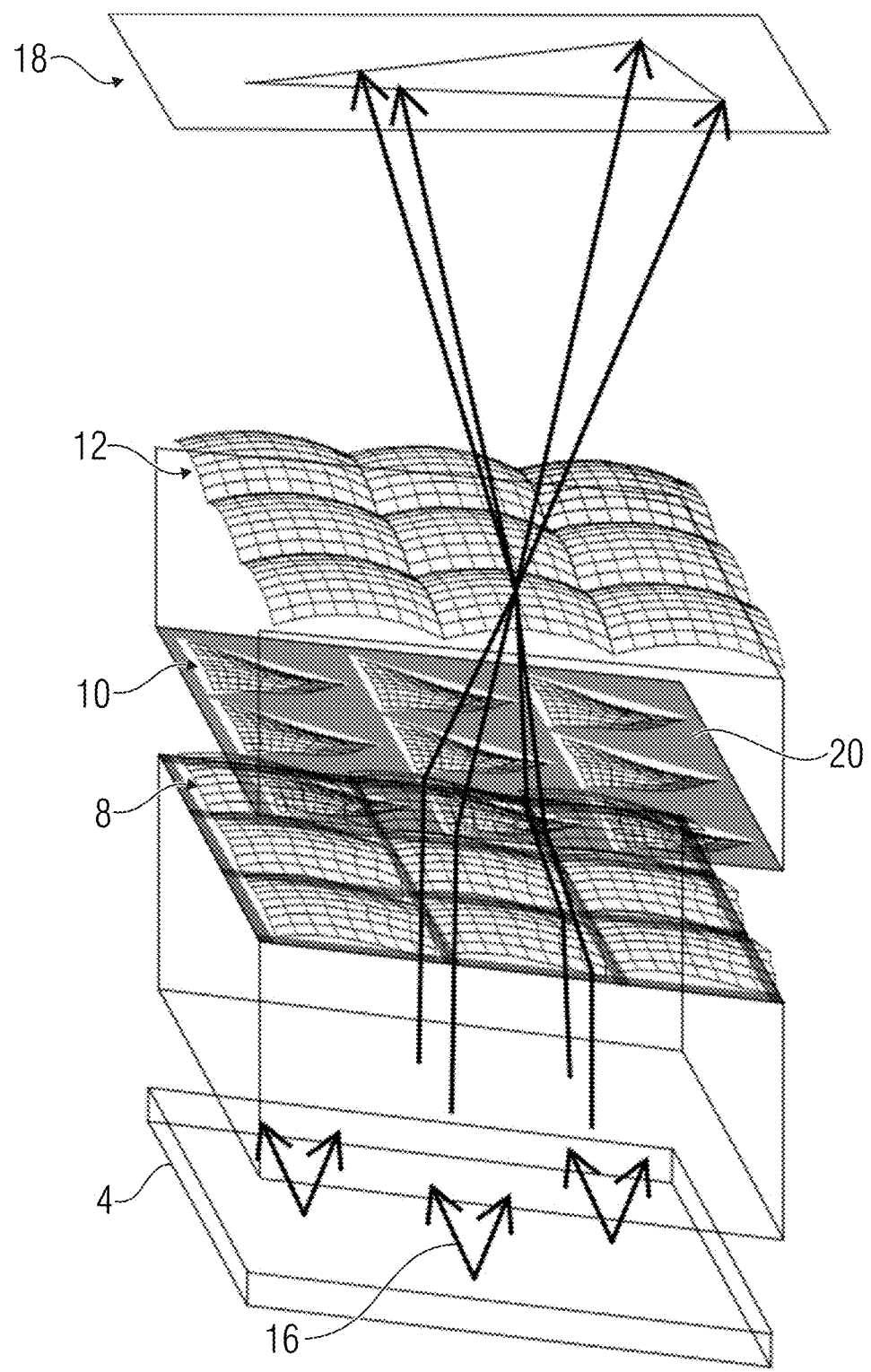
FIG. 18 shows the projection device of FIG. 17 having an additionally inclined source unit (inclination of the collimation optics and/or sources)

FIGS. 14 to 18 will be described below. FIG. 14 shows the projection device 2 having prismatic refractive optical free-form surfaces 8, 10 and a transmission-modulated structure 20 in a plane between the second refractive optical free-form surfaces 10 and the projection optics 20. FIG. 15 shows the projection device of FIG. 14, wherein the aperture structure 20 is arranged in a plane between the first refractive optical free-form surface 8 and the second refractive optical free-form surface 10. FIG. 16 shows the projection device 2, wherein the optical structures, which here are the first and second refractive optical free-form surfaces 8, 10, the aperture 20 and the projection optics 12 in the array of the optical channels are arranged on an inclined plane, wherein the inclined plane of the projection device comprises steps. FIG. 17 shows the projection device 2 of FIG. 16, wherein the inclined plane of the projection optics comprises a continuous structure and no steps. FIG. 18 shows the projection device of FIG. 17, wherein the light source 4 is also arranged on an inclined plane.

Figure 12:
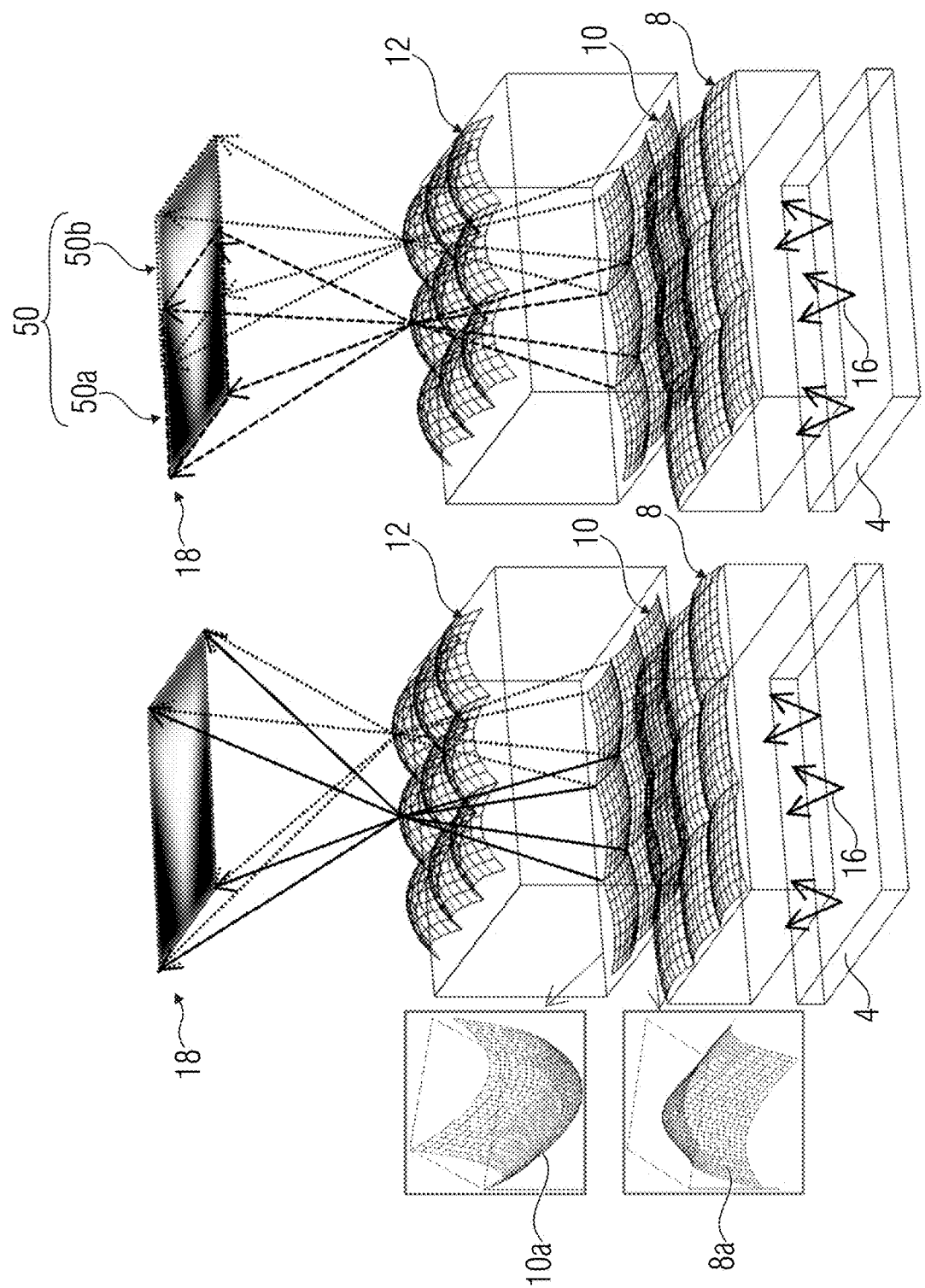
FIG. 12 is a schematic illustration of the free-form array projector for generating a bright triangular pattern with rectangular background illumination on the target, wherein different channel superimposing is applied to the target, left: all the channels serve the same region of the target with quasi-equal single channel illumination, right: different groups of channels serve different regions of the target with differing single channel illumination, wherein insets show the surface profiles of two illumination free-forms of an optics channel.

In FIG. 12, a light triangle on a less bright rectangular background is generated on the target. The two input-side free-forms, at least approximately, comprise a distorted rectangular edge shape (mapping from a rectangular input distribution to a rectangular output distribution). If, however, a triangular distribution with no background illumination is strived for on the target by pure free-form beam shaping with a rectangular lenslet arrangement, the corresponding free-form edges will reflect the topology of source and target distribution. In this case, this means that light from distorted quasi-rectangular input free-forms is transferred to distorted triangular free-forms (see FIG. 14). Apart from the topologically different form of input and output distribution, however, a strong asymmetry will occur in the power distributions. Whereas, with input light, a homogenous distribution per array channel can be assumed, the light in each array channel has to be distributed strongly asymmetrically, due to the triangular form of the output distribution. This is done by a marked-blaze characteristic (prismatic shape) of the free-forms 8; 10. The input-side first free-form has to bring much light in the direction of the triangular base area, whereas the input-side second freeform causes partial tiling back of the beams for beam angle correction. However, this blaze characteristic of the freeforms results in strong discontinuities in the optics surface at the transition between different channels. These blaze back edges will, on the one hand, result in stray light and, on the other hand, in difficulties when manufacturing the structure. Stray light minimization may again be made possible by introducing aperture structures 20 (see FIG. 14). Here, stray light analyses have to be performed for most different aperture positions and shapes (see FIGS. 14, 15).

Generally, any asymmetry in the power redistribution will result in a potentially stronger structural discontinuity, in case a trivial planar array channel arrangement is maintained (see FIGS. 2 to 15). A marked minimization and, partly, even elimination of the discontinuities can be achieved by an adapted channel arrangement. An easy way of implementing such a modification is a channel arrangement on inclined planes (see FIGS. 16, 17). Very frequently, effective focal lengths (see FIG. 5) (micro-optics) and transversal extensions of the free-form array projector are smaller by a multiple than the optics-target distance. In this case, the target pattern can be understood to be a far-field distribution where small variations of the channel-target distance do not play an important role. Power distribution asymmetries result in similar discontinuity relations in all the channel transitions. By means of longitudinal shifts of the channels by similar mean discontinuity height differences (here two dimensions), the result are arrays on inclined planes with strongly reduced discontinuities (see FIGS. 16, 17). An analog strategy may, of course, be applied approximately for finite, but not too small optics-target distances as well. Providing an adapted input distribution by collimated, tilted source units 4 (source with primary optics, see FIG. 18), for example, or by additional transformation optics in correspondence with FIG. 13 may be of advantage here. In other words, at least one optical structure may be configured to generate an asymmetrical light distribution in the image plane of the projection optics, wherein the optical structure is arranged on an inclined plane in order to reduce discontinuities between mutually adjacent optical structures of neighboring optical channels 6, and wherein the projection optics 12 is configured to project the images based on the asymmetrical light distribution. The optical structure may be the first or the second or a further refractive optical free-form surface, a transmission-modulated structure or even the light source.

Figure 19:
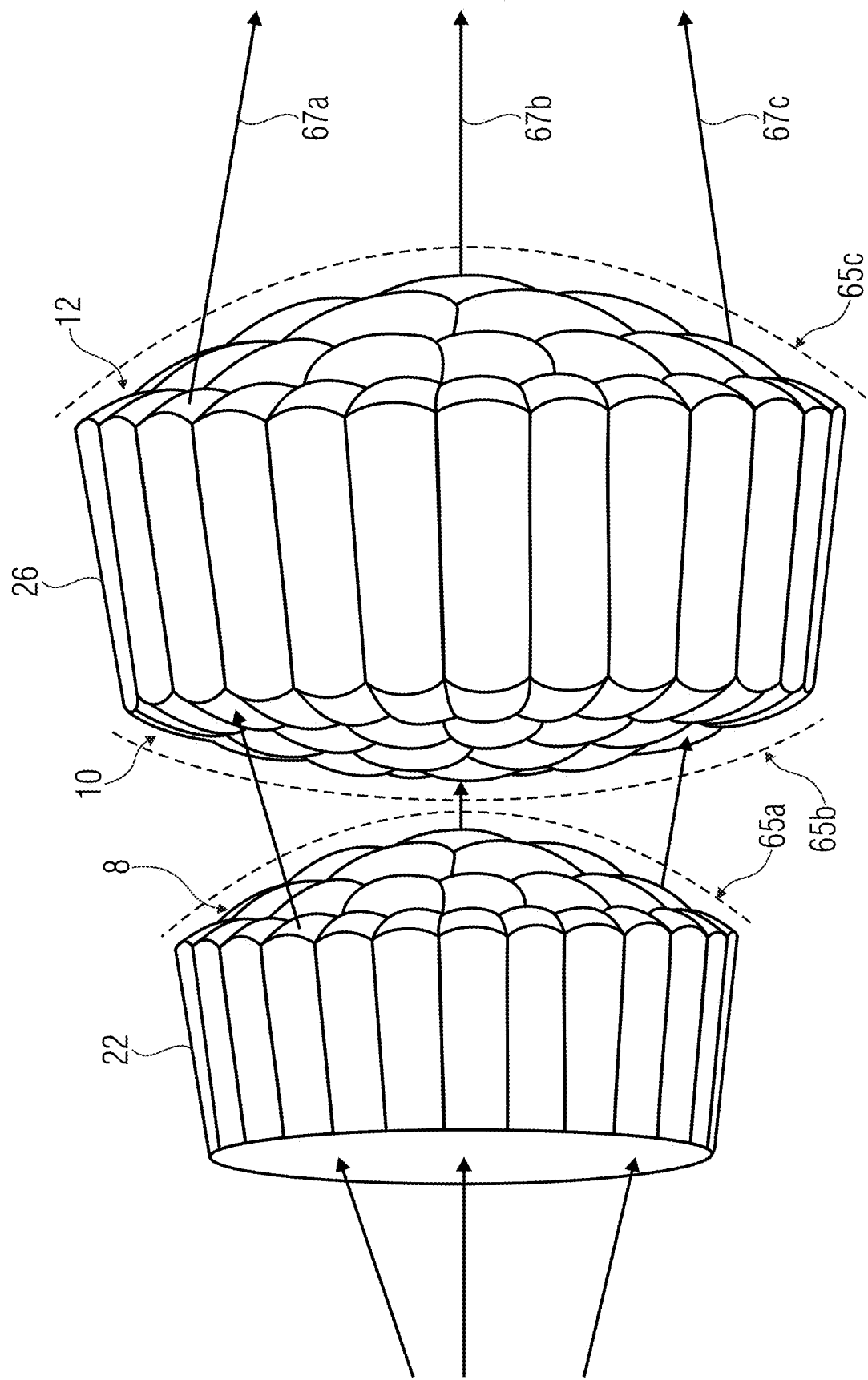
FIG. 19 is a schematic illustration of the free-form array projector having an arrangement of optics channels on curved surfaces, wherein the principal radiating angles of the individual channels here may be adapted to the source and target distribution by means of light refraction and, at the same time, discontinuities/steep transitions/dead zones/optically inactive regions between the channels can be reduced or prevented.

With finite optics-target distances or a non-trivial principal beam inclination distribution of the individual channels (for superimposing optics in analogy to FIG. 12), longitudinal channel shifts varying from channel to channel will be used in order to minimize discontinuous channel transitions. Consequently, the individual channels will be arranged on curved envelope surfaces 65a, 65b, 65c (see FIG. 19). This means that the array envelope, i.e. the optics coarse structure will check on the principal beams of the channels by means of refraction (see, for example, the arrows in FIG. 19). The irradiation intensity distributions of the individual channels in contrast are generated by channel fine structures and transmission-modulated units. Thus, by means of the channel arrangement on curved surfaces, the function of additional optics in correspondence with FIG. 13 may, on the one hand, be performed by the free-form array projector itself and, on the other hand, discontinuities/dead zones between the channels are minimized at the same time. If the channel edges are determined by the section curves of neighboring channels, discontinuities/dead zones can be avoided completely. The optics form is generated by forming the extremes (in analogy to [Michaelis]) of the individual channel structures. In other words, the first and/or the second refractive optical free-form surface and/or the projection optics of mutually adjacent optical channels may be arranged on a common curved envelope 65a, 65b, 65c, wherein principal radiation angles 67a, 67b, 67c of the mutually adjacent optical channels are adapted in order to completely avoid, or at least reduce considerably, projection artifacts and/or optically inactive regions and/or discontinuities between the array channels when superimposing the images. In addition, the envelope may function as further (refractive) optics or may take the function of the optical free-form surfaces 52, 54 having the same effect (cf. FIG. 13). Thus, even with no optically active free-form surfaces, a target distribution can be achieved largely by means of light redistribution and only to a limited extent by lossy light fading. Dead zones may, for example, be optically non-active zones which may particularly occur in a transition region between neighboring optical channels or in edge regions of optical channels. Thus, for reducing projection artifacts, no dead zones or optically non-active zones which fade out much light between the channels are generated. The light transmission of the projection device is maximized.

Figure 20:
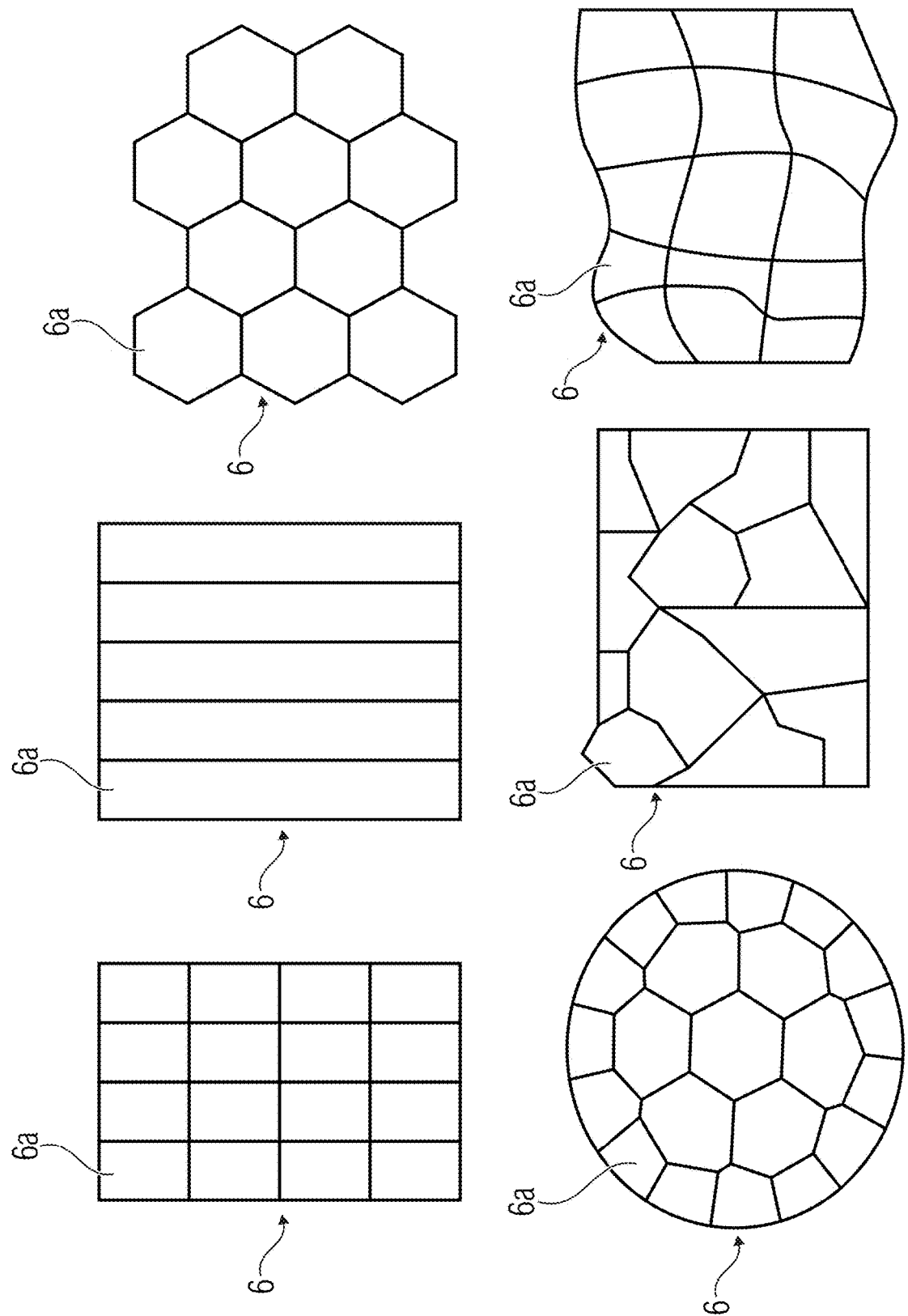
FIG. 20 is a schematic illustration of different examples of types of tiling or tessellation for the arrangement of optical channels.

Most different types of tiling or tessellation may be applied in the channel arrangement. In FIGS. 1 to 18, for reasons of simplicity, rectangular arrangement schemes were applied. FIG. 20 exemplarily shows six exemplary arrangements of the optical channels in the array of optical channels, wherein, exemplarily, six different types of tiling are shown. There are different selection criteria for the type of tiling. Complete tiling (i.e. little dead zones, small unused regions, little fading) are to be achieved, wherein the optical effect is to be implemented to be as simple as possible. The latter means that little free-form redistribution processes are to be strived for. On the one hand, this results in easier optical surfaces. On the other hand, in accordance with etendue conservation (see FIG. 5), the beam angle spectrum is influenced to a lesser degree. Complete tiling of the input-side free-form arrays with optically active regions is desirable for reasons of efficiency. The edge shapes of the input-side second free-form surfaces (per channel) are coarsely determined by the target illumination geometry provided of the channel, in case efficiency is to be maximized. In order to implement light redistribution as easily as possible, a similarity in the edges/size of the input-side first and second free-form surfaces would be of advantage. A suitable type of tiling may be determined from this. Suitable ways of tiling for the protection lenses/optics are to be considered as well. On the one hand, the illumination of the input pupil is determined by the source shape (Köhler illumination). On the other hand, manufacturing aspects have to be considered as well. In order to generate high-quality imaging micro-lenses, for example, the reflow method and UV shaping may be practical. In this case, only round lens edges will usually be present, which seems to make hexagonal tiling, for example, to be practical. In other words, the optical channels may comprise a hexagonal, rectangular, strip-like distorted regular, irregular or stochastic tiling.

With light sources of greater coherence, in contrast, a periodic arrangement may result in disturbing grid effects. Stochastic arrangements would rather be practical in such cases.

Figure 21:
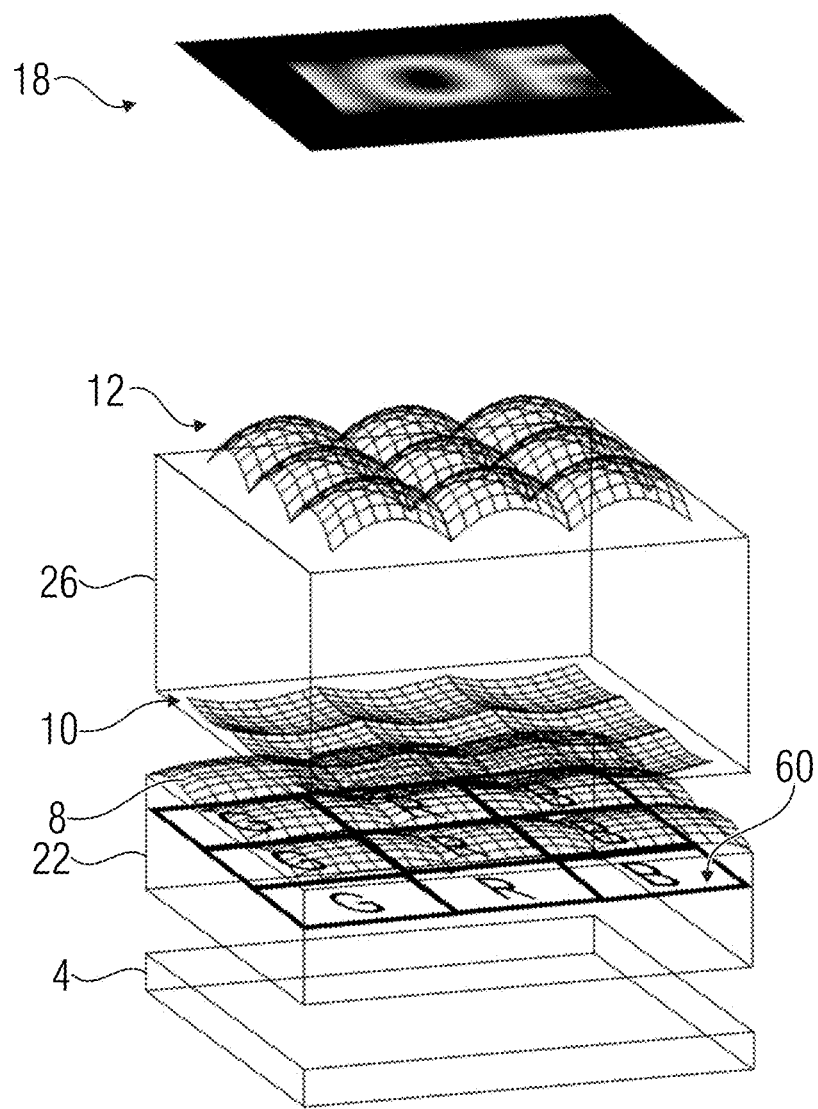
FIG. 21 is a schematic illustration of a free-form array projector having different color filters within different channel regions so that the individual channels exhibit a chromatic operation correction by the optics structure adaptation.

Free-form array projectors may exhibit chromatic aberrations. Classical aberration corrections for chromatic errors where different optical materials are used are possible, but would result in much more complex optics. A remedy here is for individual channels to serve only a limited wavelength spectrum and to be corrected directly to the wavelength. This can be achieved by illuminating different channel groups only by different color sources 60. Another way is integrating color filters into the optics channels (see FIG. 21). In other words, two channels or two groups of channels of the array of optical channels may be configured to process differing wavelength regions, wherein the first channel or the first group of channels reduces imaging errors in a first wavelength range, and wherein the second channel reduces imaging errors in a second wavelength range using the second group of channels. In order to guide light in a first wavelength range to the first channel or the first group of channels and light in a second wavelength range to the second channel or the second group of channels, the protection device may comprise a plurality of color filters or a plurality of light sources of mutually different wavelength ranges.

FIG. 22 shows a schematic flowchart of a method 2100 for projecting using a projection device having at least one light source and an array of optical channels. The method comprises step 2105 of arranging a first and a second refractive optical free-form surface between the light source and the projection optics, step 2110 of causing, using the first and second refractive optical free-form surfaces, Köhler illumination of the projection optics by an object light pattern, resulting in the image to be projected in an image surface of the projection optics, and step 2115 of superimposing the images of the array of the optical channels onto one another.

Further embodiments of the invention relate to the following examples:

(1) Beam shaper or projection unit having at least one light source and optional primary optics consisting of neighboring optical channels,
wherein each channel consists of at least two optically refractive free-form surfaces and a projection lens/optics and one or several intensity-modulated structures
wherein the optical free-form surfaces arranged on the input side cause both a spatial light redistribution and beam angle control so that a spatial real and/or virtual light pattern forms on the one hand and Köhler illumination of the downstream projection lens/optics is allowed on the other hand
wherein the projection lens/optics brings the light pattern generated by free-form light redistribution and by intensity-modulating units to one or several real or virtual targets in a desired manner
wherein superimposing the individual light distributions of all the channels on one or several real and/or virtual targets results in the desired overall light distribution.

(2) Beam shaper or projection unit in accordance with example 1, with no intensity-modulating units, wherein, in each channel, the two input-side optical free-form surfaces generate a channel-wise desired virtual object light pattern with minimum blurring effects by spatial redistribution and beam angle influencing from the source light distribution and the downstream projection lenses/optics image these virtual object light patterns onto one or several real and/or virtual targets in the best way possible.

(3) Beam shaper or projection unit in accordance with any of the preceding examples, wherein the projection optics contains one or several free-form surfaces in order to minimize the aberrations of complex virtual object patterns having formed due to the two input-side free-form surfaces.

(4) Beam shaper or projection unit in accordance with example 1, wherein, in each channel, the two input-side optical free-form surfaces guide the source light through the intensity-modulating units by spatial redistribution and beam angle influencing with little loss and the downstream projection lenses/optics image the forming light patterns onto one or several real and/or virtual targets in the best way possible.

(5) Beam shaper or projection unit in accordance with any of the preceding examples, wherein nearly all the optical channels generate approximately the same target light distributions and thus generate a maximum degree of homogenization or potential color mixing.

(6) Beam shaper or projection unit in accordance with any of the preceding examples, wherein all of or groups of optical channels generate different target light distributions at potentially different target positions and the overall light distribution on the target forms by superimposing all the optical channels.

(7) Beam shaper or projection unit in accordance with any of the preceding examples, having downstream and/or upstream additional optical surfaces/free-form surfaces common to all/some channels, which adapt the principal beam angle distribution of the individual channels to the source and target distribution used such that the desired target distribution is achieved largely by means of light redistribution and only to a limited degree by means of light absorption.

(8) Beam shaper or projection unit in accordance with any of the preceding examples, having different, further intensity-modulating structures, like aperture layers, for suppressing and minimizing stray and scattering light caused by potential optically non-active regions, due to the channel arrangement and optics form (dead zone, spurious edges, channel transition regions, etc.), as a consequence of manufacturing-caused artifacts, like non-ideal structural transitions between individual channels or roughness/structural form deviations, caused by incident light outside the acceptance angle region of the optics.

(9) Beam shaper or projection unit in accordance with any of the preceding examples, wherein all the optical structures of all the channels, i.e. illumination free-form surfaces, projection lenses/optics and intensity-modulating structures, are located on planar substrates or arranged in planes.

(10) Beam shaper or projection unit in accordance with any of the preceding examples, wherein at least some of the optical structures are arranged on inclined planes, wherein discontinuities/steep transitions between the optics structures of neighboring channels can be minimized with asymmetrical light distributions.

(11) Beam shaper or projection unit in accordance with any of the preceding examples, wherein at least some of the optical structures are arranged on curved free-form surfaces, wherein the principal radiation angles of the individual channels can be adapted by this and, at the same time, discontinuities/steep transitions/dead zones/optically inactive regions between the optics channels can be reduced or prevented.

(12) Beam shaper or projection unit in accordance with any of the preceding examples, wherein different arranging or tiling topologies of the optical channels, like hexagonal, rectangular, strip-like arrangements, may be present, but even distorted regular and irregular arrangements up to stochastic tiling may be applied.

(13) Beam shaper or projection unit in accordance with any of the preceding examples, wherein different optical channels/channel regions, due to additional different color filters within the channels or as a consequence of different associated color source units, only serve a limited wavelength spectrum and, thus, a channel-wise correction of chromatic aberrations by the channel-wise optics structure adaptation can be ensured.

Although some aspects have been described in connection with a device, it is to be understood that these aspects also represent a description of the corresponding method so that a block or element of a device is to be understood to be also a corresponding method step or feature of a method step. In analogy, aspects having been described in connection with or as a method step also represent a description of a corresponding block or detail or feature of a corresponding device.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A projection device comprising at least one light source and an array of optical channels, wherein each optical channel comprises:
   a first and a second refractive optical free-form surface and projection optics;
   wherein the first and second refractive optical free-form surfaces are arranged between the at least one light source and the projection optics, cause a light redistribution and a change in the angular distribution of light of the at least one light source, so as to obtain an object light pattern lying in an object plant of the projection optics, and cause a Köhler illumination of the projection surface of the projection device (2) via the projection optics by the object light pattern,
   where in an image to be projected results on the projection surface of the projection device by a superimposition of light from the optical channels.

2. The projection device in accordance with claim 1, comprising a transmission-modulating structure configured to spatially shape the object light pattern in order to generate the image to be projected in the image plane of the projection optics with sharper edges than compared to imaging with no transmission-modulating structures.

3. The projection device in accordance with claim 1,
   wherein the second refractive optical free-form surface is, relative to a light propagation direction, arranged behind the refractive optical free-form surface (8)
   wherein the first refractive optical free-form surface is configured to perform a spatial light redistribution and/or control of the ray direction angles of light rays emitted by the light source; and/or
   wherein the second refractive optical free-form surface is configured to direct light rays onto the projection optics in a convergent manner in accordance with Köhler illumination;
   wherein the first and second refractive optical free-form surfaces influence each other.

4. The projection device in accordance with claim 1, wherein the first and/or the second optically refractive free-form surface(s) is/are configured so that an irradiance of the light from the light source in a light-transparent region of the transmission-modulating structure, is higher than the irradiance on a light-intransparent region of the transmission-modulating structure.

5. The projection device in accordance with claim 1, wherein the first and second optically refractive free-form surfaces are configured to generate, based on a real light pattern, a virtual object light pattern in the optical channel between the light source and the second refractive optical free-form surface, wherein the virtual object light pattern results from imaging of the image to be projected, and wherein the real light pattern forms after transmitting through the first and second refractive optical free-form surfaces.

6. The projection device in accordance with claim 1,
   wherein the projection optics is configured to image the image to be projected onto a real or onto a virtual projection surface; or
   wherein the projection optics of the array of optical channels are configured to superimpose the images to be projected on a real or on a virtual projection surface.

7. The projection device in accordance with claim 1, wherein the individual channels of the array of optical channels are configured to superimpose images comprising the same subject on a real or virtual projection surface.

8. The projection device in accordance with claim 1, wherein the individual channels or groups of channels of the array of optical channels are configured to generate mutually differing images on a real or virtual projection surface, wherein an overall image is generated on the real or virtual projection surface by means of at least partial superimposing of the differing images.

9. The projection device in accordance with claim 1, wherein the projection optics comprises at least one further refractive optical free-form surface configured to correct an imaging error or a plurality of imaging errors in a projected image.

10. The projection device in accordance with claim 1, wherein optical structures of all the channels of the array of optical channels are arranged on planar substrates and/or in planes.

11. The projection device in accordance with claim 1, wherein the first and/or the second refractive optical free-form surface(s) and/or the projection optics of mutually adjacent optical channels are arranged on a common curved envelope each, wherein chief ray direction angles of the mutually adjacent optical channels are adapted in order to avoid projection artifacts and/or optically inactive regions and/or discontinuities between the array channels when superimposing the images.

12. The projection device in accordance with claim 1, wherein the projection device comprises at least one further transmission-modulated structure which suppresses scattering and/or stray light.

13. The projection device in accordance with claim 1, wherein the optical channels comprise hexagonal, rectangular, strip-like, distorted regular, irregular or stochastic tiling.

14. A method for performing a projection, comprising
   Using a projection device according to claim 1, so as to project obtain an image to be projected on a projection surface of the projection device.

15. The projection device in accordance with claim 1,
   wherein the second refractive optical free-form surface is, relative to a light propagation direction, arranged behind the refractive optical free-form surface,
   wherein the first refractive optical free-form surface is configured to achieve, apart from a light convergence, a light re-direction by compressing incident light in a first light re-direction areas to achieve a irradiation increase and widening the incident light in second first light re-direction areas to achieve a irradiation decrease so that the second refractive optical free-form surface receives and redirects beam directions which are changed due to the light re-direction and so that the at least one light source is imaged onto an input pupil of the projection optics in an aberrated manner.

16. The projection device in accordance with claim 1, wherein the first refractive optical free-form surface is composed of ellipsoids and conics and the second refractive optical free-form surface is composed of Cartesian ovals which are placed at foci of the ellipsoids and conics, wherein the ellipsoids and conics are placed at foci of the Cartesian ovals.

17. The projection device in accordance with claim 1, wherein the objection plane of the projection optics, in which the object light pattern is located, lies between the light source and the second refractive optical free-form surface.

18. A projection device comprising at least one light source and an array of optical channels, wherein each channel comprises:
   a first and a second refractive optical free-form surface and projection optics;
   wherein the first and second refractive optical free-form surfaces are arranged between the at least one light source and the projection optics and cause Köhler illumination of the projection optics by an object light pattern, resulting in an image to be projected by superimposing images of the optical channels of the array on an image surface of the projection optics, wherein the object light pattern is a light pattern to be imaged by the projection optics and comprises a light distribution;
   wherein two channels or two groups of channels of the array of optical channels are configured to process differing wavelength ranges, wherein the first channel or the first group of channels reduces imaging errors in a first wavelength range, and wherein the second channel or the second group of channels reduces imaging errors in a second wavelength range.

19. The projection device in accordance with claim 18, wherein the projection device comprises a plurality of color filters or a plurality of light sources of differing wavelength ranges, wherein the plurality of color filters or the plurality of light sources are configured to direct light in a first wavelength range to the first channel or the first group of channels and to direct light in a second wavelength range to the second channel or the second group of channels.

20. A projection device comprising at least one light source and an array of optical channels, wherein each channel comprises:
   a first and a second refractive optical free-form surface and projection optics;
   wherein the first and second refractive optical free-form surfaces are arranged between the at least one light source and the projection optics and cause Köhler illumination of the projection optics by an object light pattern, resulting in an image to be projected by superimposing images of the optical channels of the array on an image surface of the projection optics, wherein the object light pattern is a light pattern to be imaged by the projection optics and comprises a light distribution,
   wherein at least one optical structure is configured to generate an asymmetrical light distribution in the image plane of the projection optics, wherein the optical structure is arranged on an inclined plane in order to reduce discontinuities between mutually adjacent optical structures of neighboring optical channels, and wherein the projection optics is configured to project the images based on the asymmetrical light distribution.

* * * * *